(12) United States Patent
Mor Yosef et al.

(10) Patent No.: US 10,993,520 B2
(45) Date of Patent: May 4, 2021

(54) NAIL POLISH KIT FOR USE BY AN AUTOMATED NAIL POLISH APPLICATION APPARATUS

(71) Applicant: Nailomatic Ltd., Tel-Aviv (IL)

(72) Inventors: Avichay Mor Yosef, Jerusalem (IL); Ron Miller, Herzlia (IL); Omri Moran, New York, NY (US); Gil Sokol, Tel-Aviv (IL)

(73) Assignee: Nailomatic Ltd., Tel-Aviv (IL)

( * ) Notice: Subject to any disclaimer, the term of this patent is extended or adjusted under 35 U.S.C. 154(b) by 119 days.

(21) Appl. No.: 16/481,851

(22) PCT Filed: Jan. 31, 2018

(86) PCT No.: PCT/IL2018/050110
§ 371 (c)(1),
(2) Date: Jul. 30, 2019

(87) PCT Pub. No.: WO2018/142400
PCT Pub. Date: Aug. 9, 2018

(65) Prior Publication Data
US 2020/0060406 A1 Feb. 27, 2020

Related U.S. Application Data

(60) Provisional application No. 62/574,241, filed on Oct. 19, 2017, provisional application No. 62/533,720, (Continued)

(51) Int. Cl.
*A45D 29/18* (2006.01)
*A45D 34/04* (2006.01)
(Continued)

(52) U.S. Cl.
CPC .......... *A45D 29/18* (2013.01); *A45D 34/042* (2013.01); *A45D 34/045* (2013.01); *A46B 9/021* (2013.01);
(Continued)

(58) Field of Classification Search
CPC ........ A45D 29/18; A45D 29/20; A45D 34/00; A45D 34/04; A45D 34/042; A45D 34/043;
(Continued)

(56) References Cited

U.S. PATENT DOCUMENTS

| 3,130,734 A | 4/1964 | Ellis et al. |
| 3,292,642 A | 12/1966 | Del Vecchio |

(Continued)

FOREIGN PATENT DOCUMENTS

| CN | 85203506 | 4/1986 |
| CN | 1277589 | 12/2000 |

(Continued)

OTHER PUBLICATIONS

Notification of Office Action and Search Report dated Jul. 3, 2020 From the State Intellectual Property Office of the People's Republic of China Re. Application No. 201880018297.0. (8 Pages).

(Continued)

*Primary Examiner* — David J Walczak

(57) ABSTRACT

A kit for usage by a nail polish application apparatus, the kit comprising one or more nail polish capsules. Each of the nail polish capsule(s) comprises a body portion defining a reservoir containing a nail polish fluid and a non-screw detachable cover having an integrated nail polish applying element. The non-screw detachable cover is mechanically coupled to an upper face of the body portion to seal an opening in the upper face.

19 Claims, 20 Drawing Sheets

Related U.S. Application Data filed on Jul. 18, 2017, provisional application No. 62/452,461, filed on Jan. 31, 2017.

(51) Int. Cl.
    *A45D 29/00*         (2006.01)
    *A45D 34/00*         (2006.01)
    *A46B 9/02*          (2006.01)

(52) U.S. Cl.
    CPC ...... *A45D 29/007* (2013.01); *A45D 2034/002* (2013.01); *A45D 2200/054* (2013.01); *A45D 2200/055* (2013.01); *A46B 2200/1046* (2013.01)

(58) Field of Classification Search
    CPC .... A45D 34/045; A45D 34/046; A45D 40/00; A45D 40/26; A45D 40/262; A45D 40/264; A45D 40/265; A45D 40/267; A45D 2200/054; A45D 29/007; A45D 2034/002; A45D 2034/00; A45D 2200/055; A46B 9/021; A46B 2200/1046; A46B 2200/1053; A46B 15/0055; A46B 15/0061
    USPC ........................................ 401/131, 123–130
See application file for complete search history.

(56) References Cited

U.S. PATENT DOCUMENTS

| | | | |
|---|---|---|---|
| 3,411,853 A | 11/1968 | Hoff | |
| 3,840,136 A | 10/1974 | Lanfranconi et al. | |
| 4,149,814 A | 4/1979 | Manwaring | |
| 4,599,008 A | 7/1986 | Furlong et al. | |
| 4,640,637 A | 2/1987 | Winthrop | |
| 4,854,760 A | 8/1989 | Pike et al. | |
| 4,955,745 A | 9/1990 | Vauquelin | |
| 5,253,942 A | 10/1993 | Stokes | |
| 5,947,622 A | 9/1999 | Akyildiz et al. | |
| 6,174,099 B1 | 1/2001 | Patel et al. | |
| 6,209,548 B1 | 4/2001 | Harrison et al. | |
| 6,283,660 B1 | 9/2001 | Furlong et al. | |
| 6,286,517 B1 | 9/2001 | Weber et al. | |
| 6,530,709 B1 | 3/2003 | Washington | |
| 7,472,709 B1 | 1/2009 | Nickerson | |
| 7,918,620 B2 * | 4/2011 | Del Ponte | A45D 40/18 401/131 |
| 8,814,291 B2 | 8/2014 | Bitoh | |
| 8,893,731 B2 * | 11/2014 | Pires | A45D 33/006 132/294 |
| 8,978,665 B2 | 3/2015 | Liu et al. | |
| 8,991,405 B2 | 3/2015 | Rose | |
| 9,179,753 B2 | 11/2015 | Huynh | |
| 9,462,869 B2 | 10/2016 | Bitoh | |
| 9,510,658 B2 | 12/2016 | Nagao | |
| 9,526,313 B2 | 12/2016 | Asako | |
| 9,635,923 B2 | 5/2017 | Bitoh | |
| 9,642,436 B2 | 5/2017 | Miyamoto | |
| 9,675,159 B2 | 6/2017 | Bitoh | |
| 9,743,740 B2 | 8/2017 | Teshima | |
| 9,799,116 B2 | 10/2017 | Kafuku | |
| 9,820,547 B2 | 11/2017 | Yamasaki | |
| 9,888,759 B2 | 2/2018 | Asako | |
| 9,894,976 B2 | 2/2018 | Shimizu | |
| 9,894,978 B2 | 2/2018 | Nagao | |
| 10,022,984 B2 | 7/2018 | Irie | |
| 10,130,154 B2 | 11/2018 | Irie | |
| 2005/0156097 A1 | 7/2005 | Tatarsky et al. | |
| 2006/0273200 A1 | 12/2006 | Williams et al. | |
| 2007/0014624 A1 * | 1/2007 | Fogelson | A45D 40/18 401/131 |
| 2007/0269255 A1 | 11/2007 | Marcellus | |
| 2010/0252058 A1 | 10/2010 | Rehkemper et al. | |
| 2011/0304877 A1 | 12/2011 | Bitoh | |
| 2012/0287183 A1 | 11/2012 | Bitoh | |
| 2013/0206156 A1 | 8/2013 | Salo | |
| 2013/0287472 A1 | 10/2013 | Cheng | |
| 2014/0076342 A1 | 3/2014 | Huynh | |
| 2014/0132968 A1 | 5/2014 | Bitoh et al. | |
| 2014/0133895 A1 | 5/2014 | Dockery | |
| 2014/0352709 A1 | 12/2014 | Liu et al. | |
| 2015/0082654 A1 | 3/2015 | Jaegal et al. | |
| 2015/0335131 A1 | 11/2015 | Ortiz et al. | |
| 2016/0083153 A1 | 3/2016 | Apodaca | |
| 2016/0270504 A1 | 9/2016 | Miyamoto | |
| 2016/0345708 A1 | 12/2016 | Walia et al. | |
| 2017/0071314 A1 | 3/2017 | Irie | |
| 2017/0072702 A1 | 3/2017 | Collett | |
| 2017/0181521 A1 | 6/2017 | Yamasaki | |
| 2017/0273432 A1 | 9/2017 | Irie | |
| 2019/0365077 A1 | 12/2019 | Mor Yosef et al. | |
| 2020/0205549 A1 | 7/2020 | Mor Yosef et al. | |

FOREIGN PATENT DOCUMENTS

| | | |
|---|---|---|
| CN | 2508611 | 9/2002 |
| CN | 201718715 | 1/2011 |
| CN | 104544907 | 4/2015 |
| DE | 337676 | 1/1922 |
| EP | 0208454 | 1/1987 |
| EP | 0751724 | 1/1997 |
| FR | 2770495 | 5/1999 |
| FR | 2941217 | 7/2010 |
| GB | 2206486 | 1/1989 |
| GB | 2344776 | 6/2000 |
| JP | 2019-128633 | 8/2019 |
| WO | WO 2016/014132 | 1/2016 |
| WO | WO 2016/193108 | 12/2016 |
| WO | WO 2017/163237 | 9/2017 |
| WO | WO 2018/142399 | 8/2018 |
| WO | WO 2018/142400 | 8/2018 |
| WO | WO 2018/142401 | 8/2018 |

OTHER PUBLICATIONS

Official Action dated Jul. 8, 2020 from the US Patent and Trademark Office Re. U.S. Appl. No. 16/481,856. (41 pages).
International Preliminary Report on Patentability dated Aug. 15, 2019 From the International Bureau of WIPO Re. Application No. PCT/IL2018/050109. (12 Pages).
International Preliminary Report on Patentability dated Aug. 15, 2019 From the International Bureau of WIPO Re. Application No. PCT/IL2018/050110. (10 Pages).
International Preliminary Report on Patentability dated Aug. 15, 2019 From the International Bureau of WIPO Re. Application No. PCT/IL2018/050111. (7 Pages).
International Search Report and the Written Opinion dated May 1, 2018 From the International Searching Authority Re. Application No. PCT/IL2018/050110. (16 Pages).
International Search Report and the Written Opinion dated Jul. 6, 2018 From the International Searching Authority Re. Application No. PCT/IL2018/050109. (21 Pages).
International Search Report and the Written Opinion dated Jul. 13, 2018 From the International Searching Authority Re. Application No. PCT/IL2018/050111. (14 Pages).
Invitation to Pay Additional Fees dated May 4, 2018 From the International Searching Authority Re. Application No. PCT/IL2018/050109. (3 Pages).
Invitation to Pay Additional Fees dated May 15, 2018 From the International Searching Authority Re. Application No. PCT/IL2018/050111. (2 Pages).
Dreamstime "Bottle Wrapped With Gold Foil, Stock Image—Image of Bubbles", Dreamstime, ID 33924547, Retrieved From the Internet, 2 P., Aug. 13, 2013. Fig.1.
Yusuf "Heat Shrinking Caps of Bottles", YouTube, Retrieved From the Internet, 1 P., Aug. 27, 2015. 0:53, 1:24, Description.
Supplementary European Search Report and the European Search Opinion dated Aug. 4, 2020 From the European Patent Office Re. Application No. 18747330.1. (9 Pages).

(56) References Cited

OTHER PUBLICATIONS

Supplementary European Search Report and the European Search Opinion dated Aug. 10, 2020 From the European Patent Office Re. Application No. 18748805.1. (7 Pages).
Supplementary European Search Report and the European Search Opinion dated Aug. 10, 2020 From the European Patent Office Re. Application No. 18747437.4. (7 Pages).

* cited by examiner

SECTION B-B

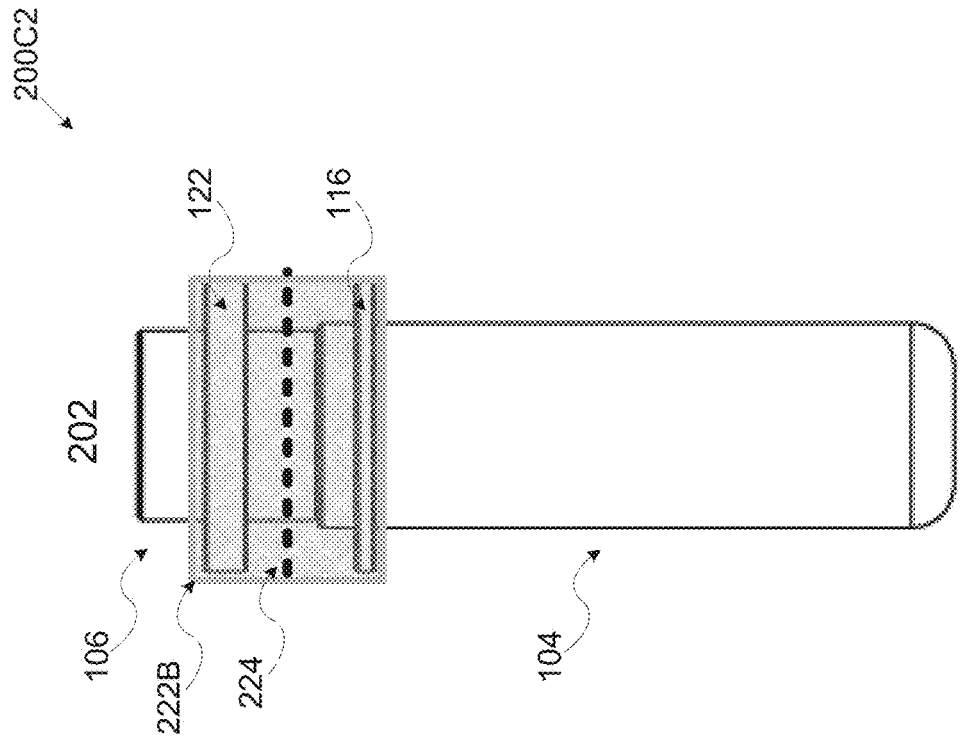
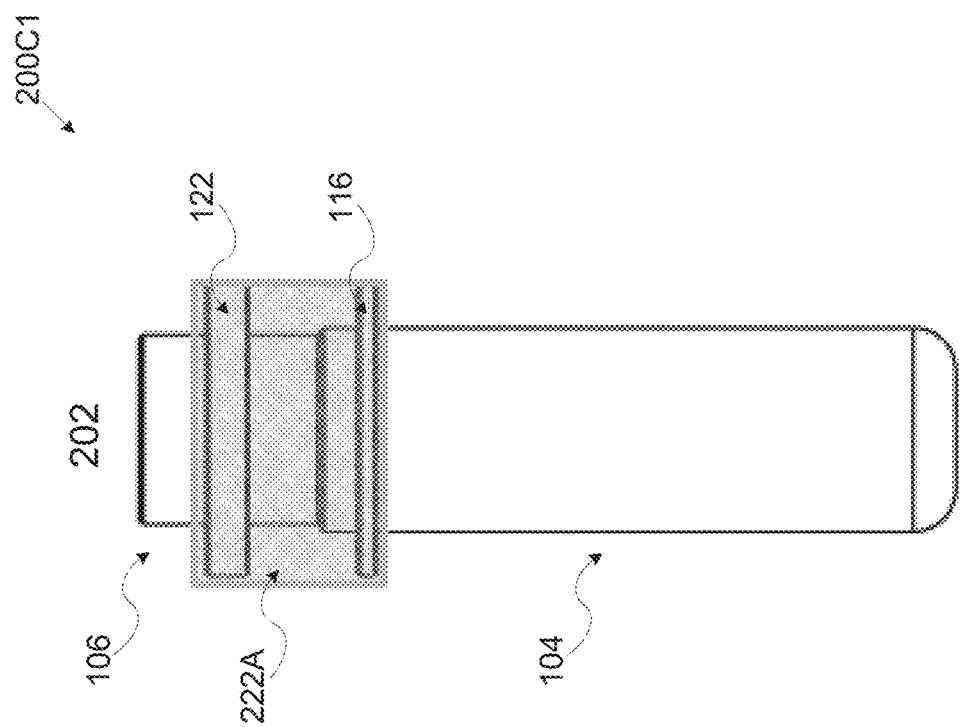
FIG. 4

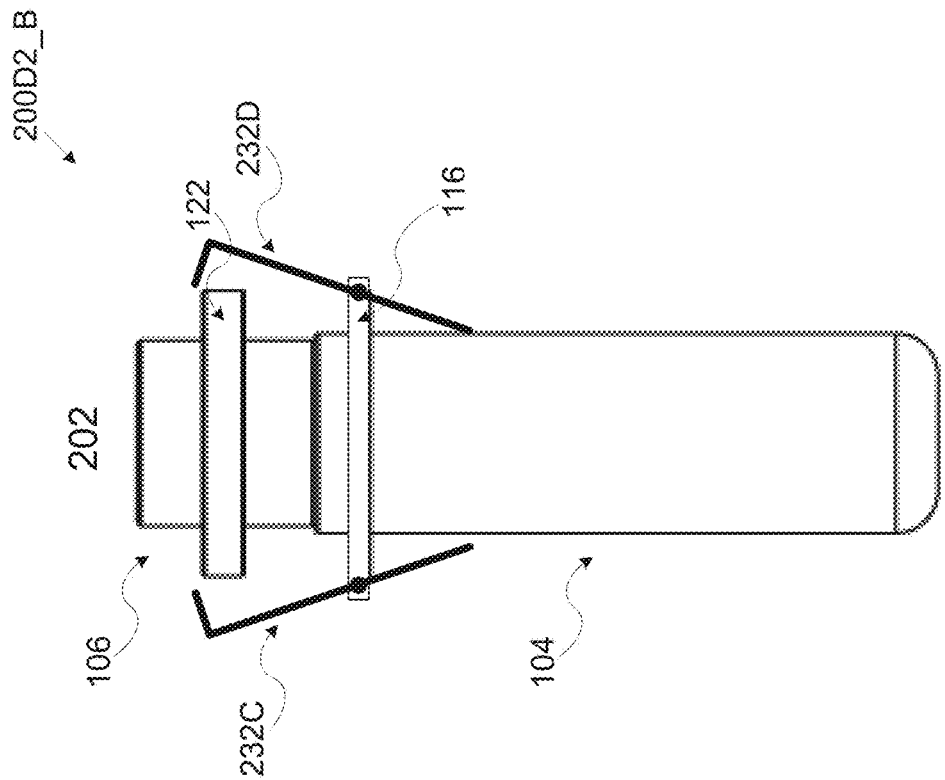
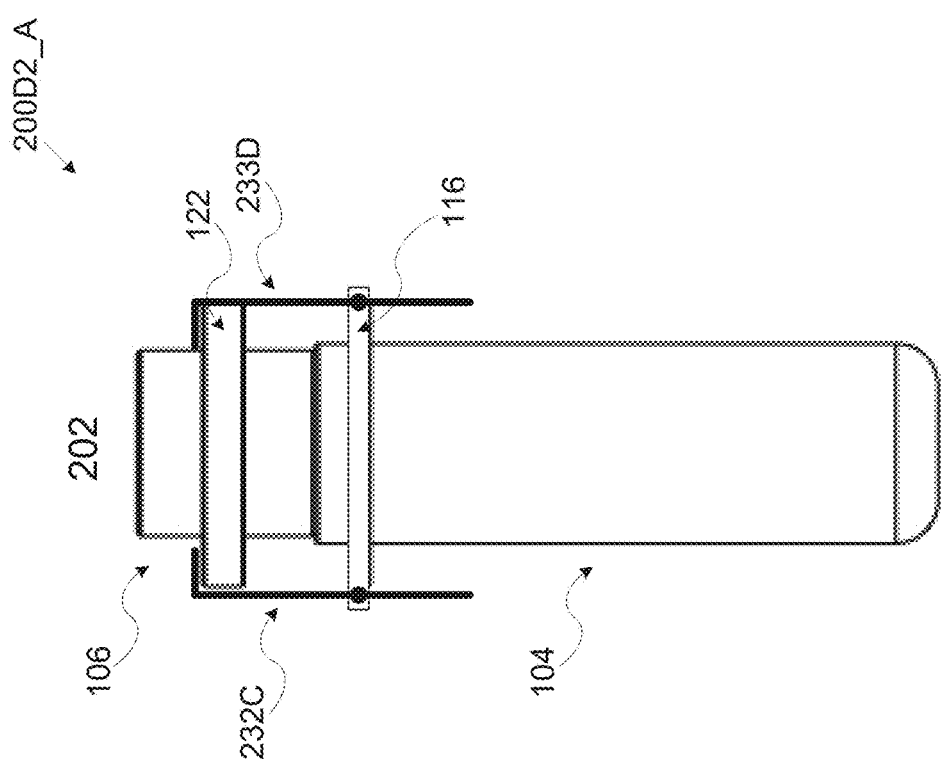
FIG. 5B

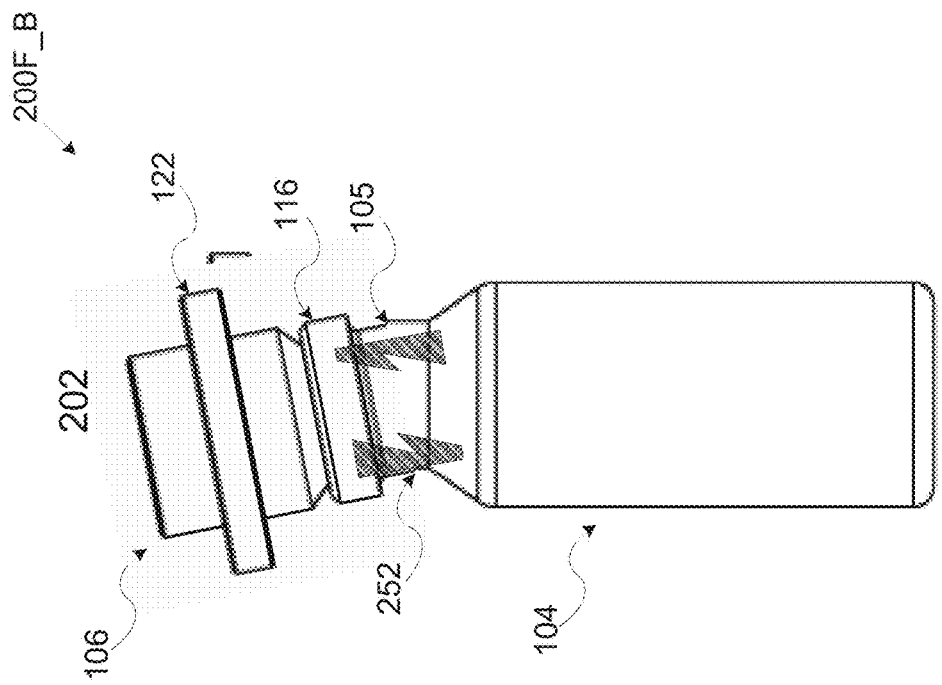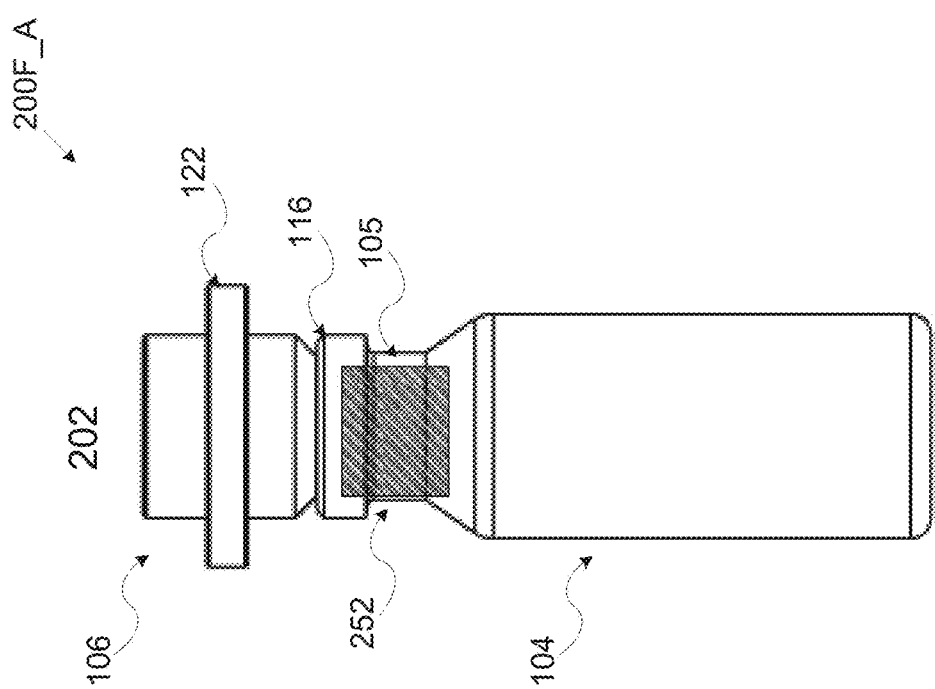
FIG. 7

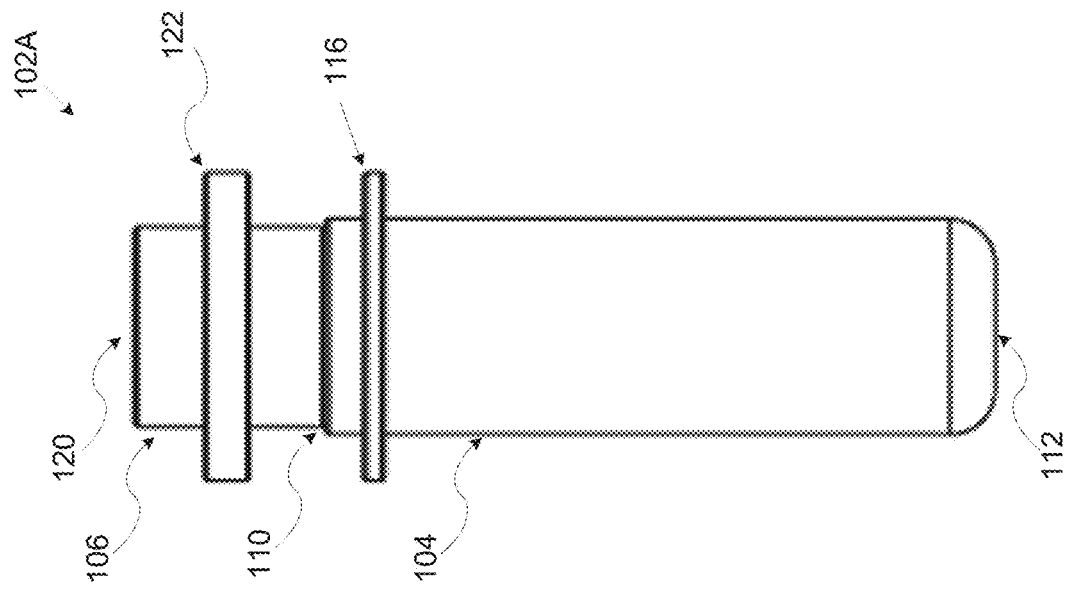
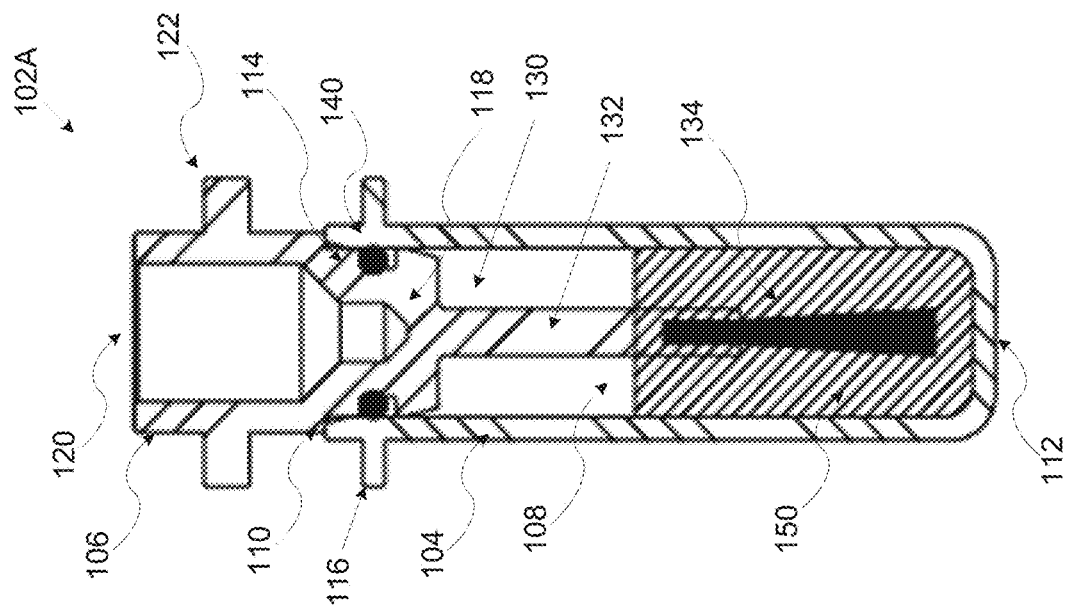
FIG. 8A

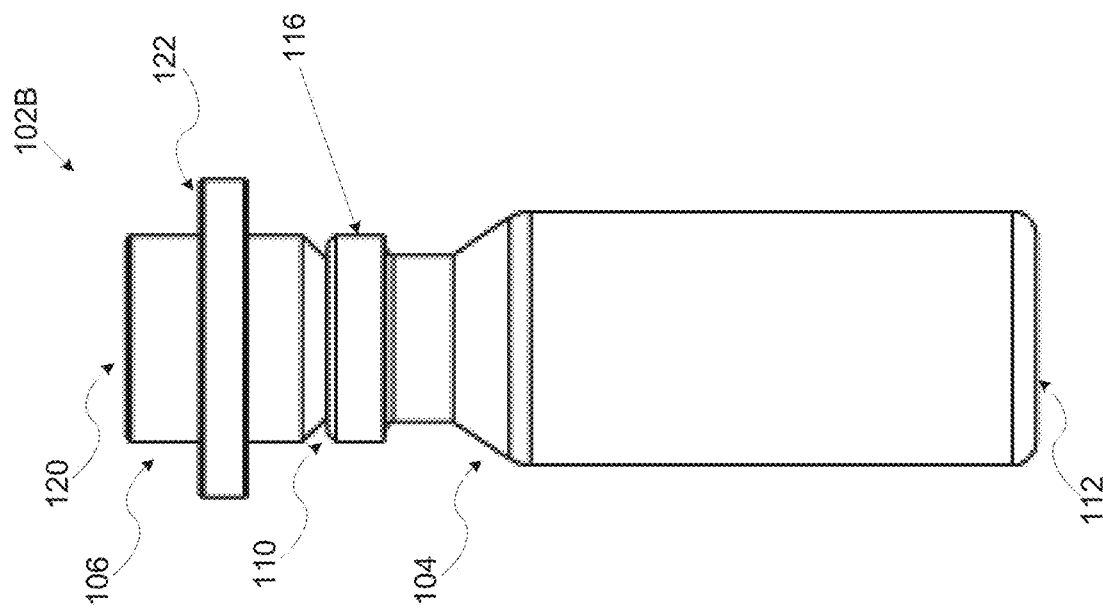
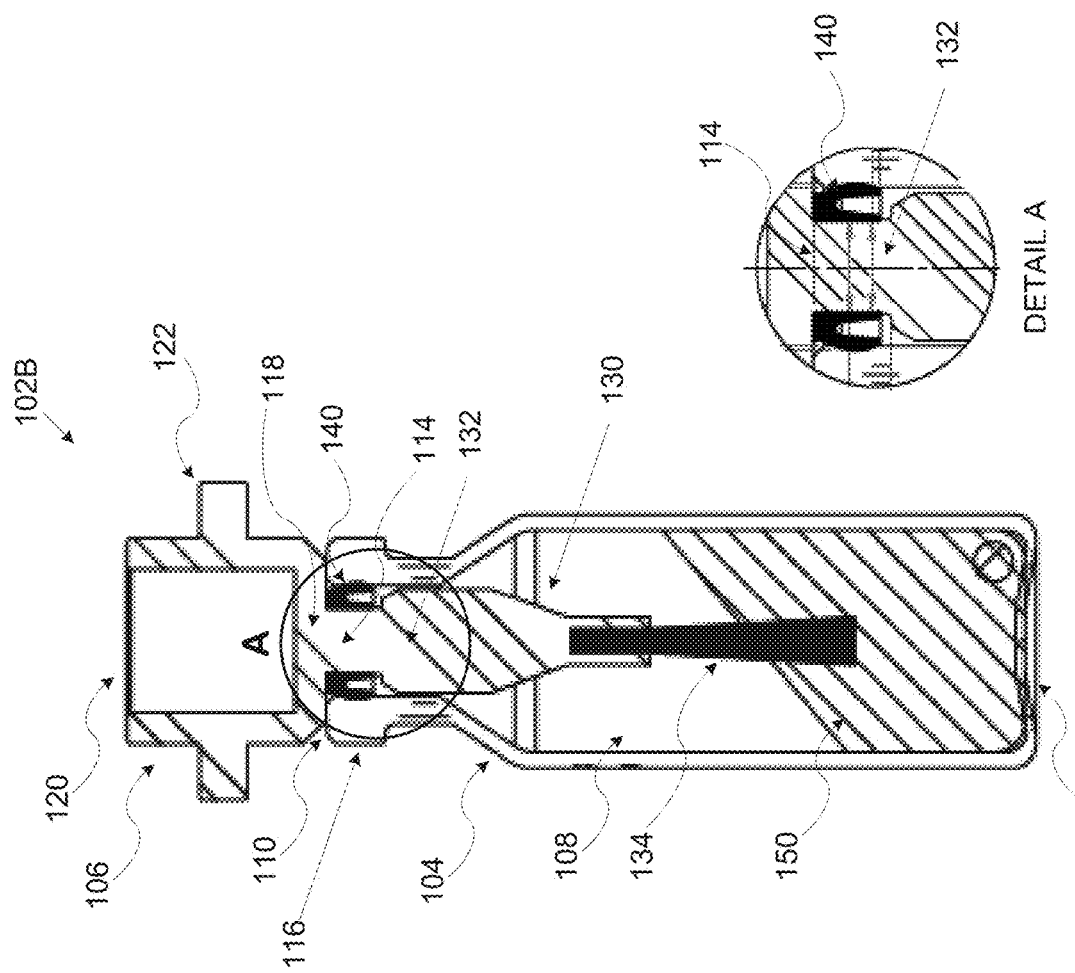
FIG. 8B

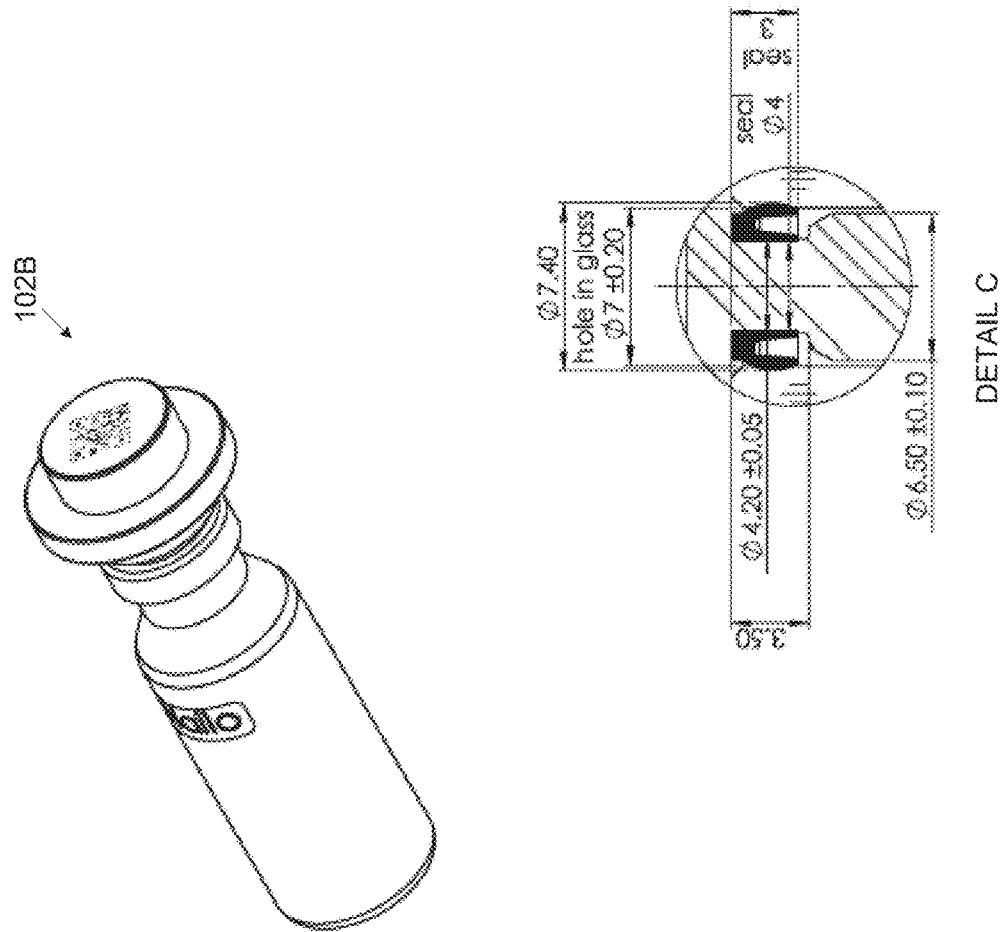
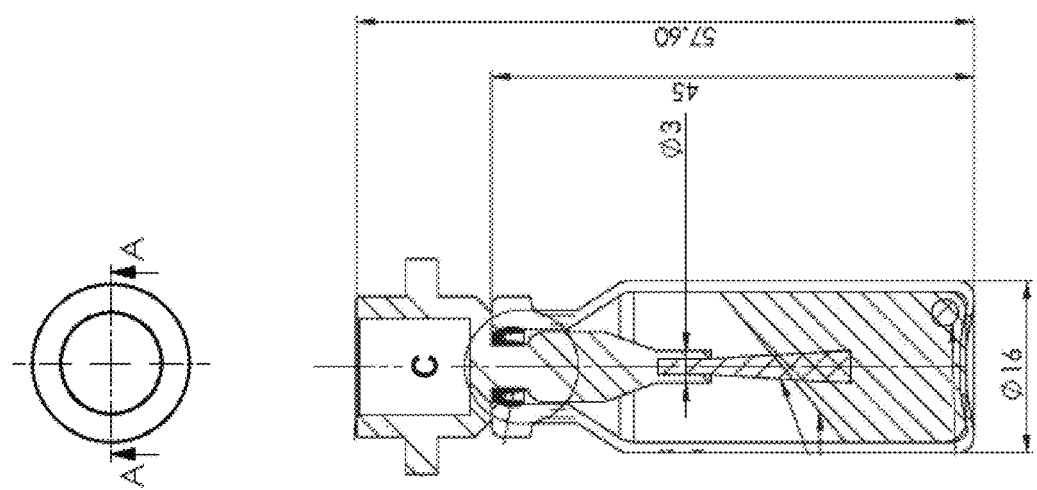
FIG. 9

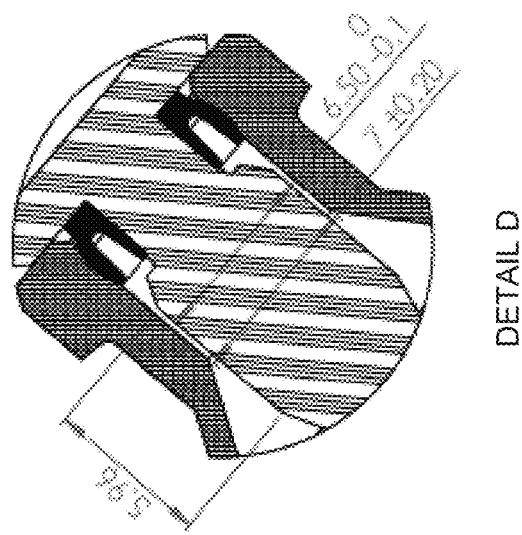
DETAIL D
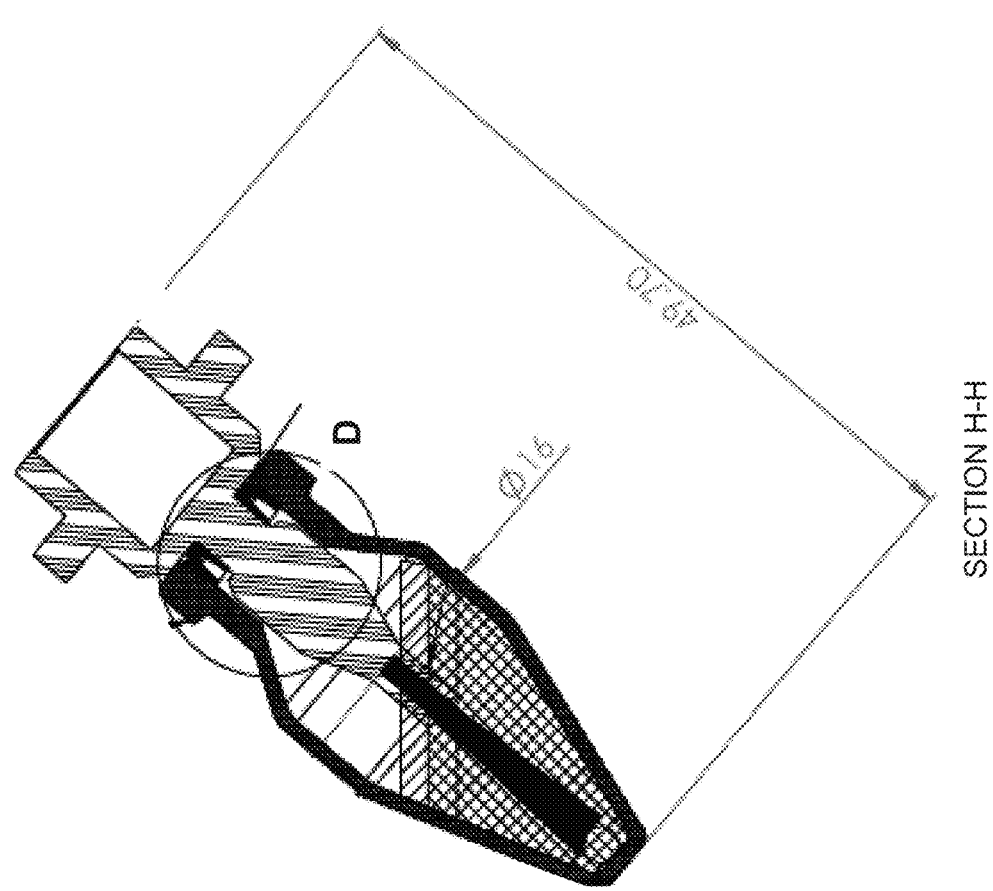
SECTION H-H
FIG. 10B

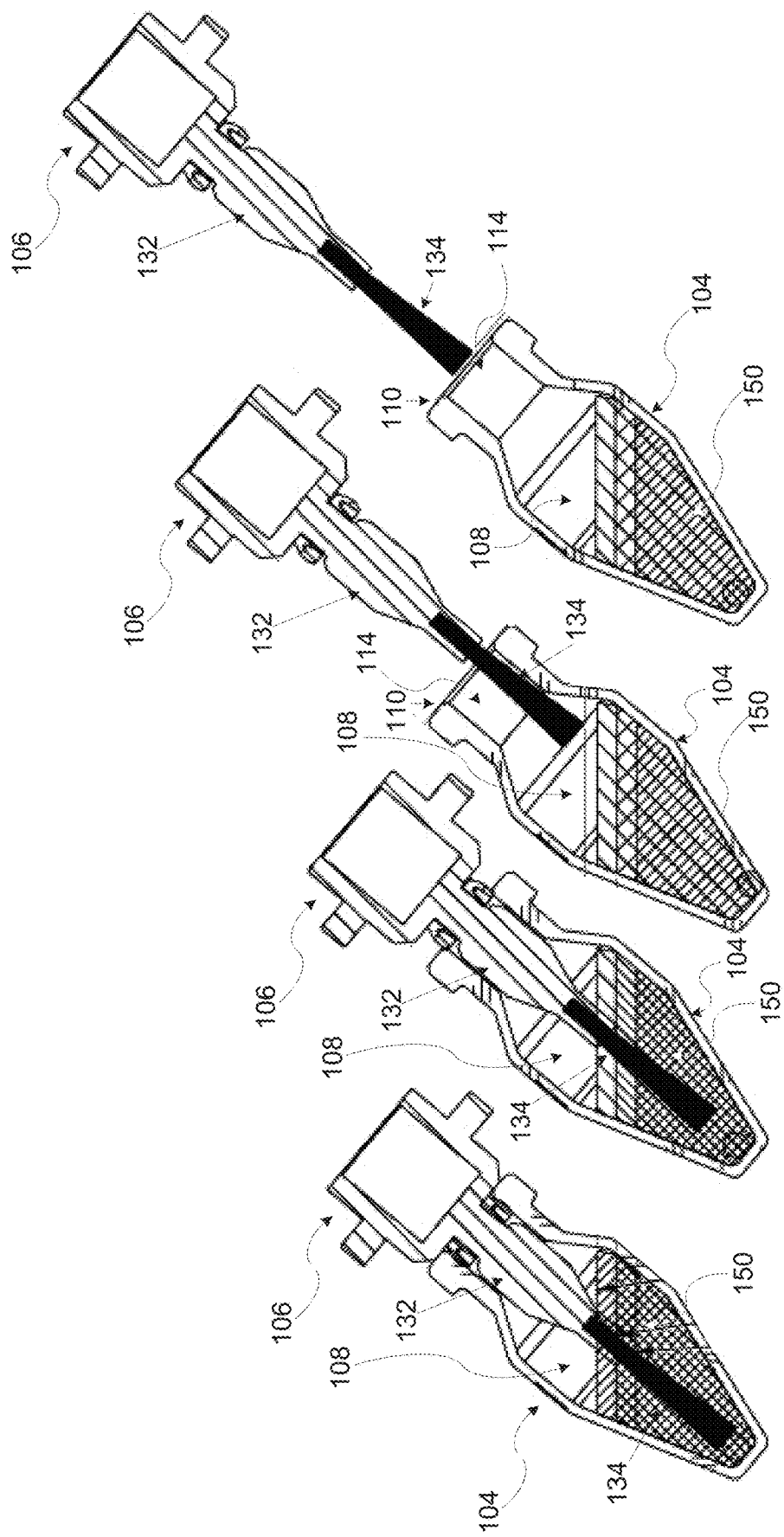

NAIL POLISH KIT FOR USE BY AN AUTOMATED NAIL POLISH APPLICATION APPARATUS

RELATED APPLICATIONS

This application is a National Phase of PCT Patent Application No. PCT/IL2018/050110 having International filing date of Jan. 31, 2018, which claims the benefit of priority under 35 USC § 119(e) of U.S. Provisional Patent Application Nos. 62/574,241 filed on Oct. 19, 2017; 62/533,720 filed on Jul. 18, 2017 and 62/452,461 filed on Jan. 31, 2017. The contents of the above applications are all incorporated by reference as if fully set forth herein in their entirety.

FIELD AND BACKGROUND OF THE INVENTION

The present invention, in some embodiments thereof, relates to a kit for usage by an automated nail polish application apparatus and, more particularly, but not exclusively, to a kit comprising one or more nail polish capsules for usage by an automated nail polish application apparatus.

Applying nail polish to fingernails and/or toenails has been practiced since ancient times. Decorating the finger and/or toe nails is still fashionable in modern times as many people, in particular woman apply nail polish to decorate their fingernails and/or toenails.

Traditionally, manual nail polish application is the most common method. The manual nail polish application may require some expertise, skills and/or experience and may be time consuming. In addition manual application of the nail polish to one self's nails may be physically challenging due to the need to master the art in both hands and in case of the foot toenails reaching conveniently and efficiently the toes may also present difficulties. While many individuals have mastered the art of applying the nail polish manually for themselves, nail polish application may typically be practiced by professional manicurists and/or pedicurists.

With the advancement of technology and an enabling technical environment, automated nail polish application is becoming more common and popular and automated nail polish application apparatuses are used by more and more users for efficiently applying nail polish.

SUMMARY OF THE INVENTION

According to a first aspect of the present invention there is provided a kit for usage by a nail polish application apparatus, the kit comprising one or more nail polish capsules. Each of the nail polish capsule(s) comprises a body portion defining a reservoir containing a nail polish fluid and a non-screw detachable cover having an integrated nail polish applying element. The non-screw detachable cover is mechanically coupled to an upper face of the body portion to seal an opening in the upper face.

According to a second aspect of the present invention there is provided a method for manufacturing a kit for usage by a nail polish application apparatus, comprising producing one or more nail polish capsules by:
Producing a body portion defining a reservoir adapted to contain nail polish fluid.
Producing a non-screw detachable cover having an integrated nail polish applying element.
Inserting the nail polish fluid into the body portion.
Mechanically coupling the non-screw detachable cover to an upper face of the body portion to seal an opening in the upper face.

Such a kit may be easily used by an automated nail polish application apparatus since attachment/detachment of the detachable cover to the body portion is not utilized by a screwing mechanism hence no complex rotation and/or screwing operations and/or mechanisms are required by the nail polish application apparatus. This may significantly reduce the complexity and/or cost of the nail polish application apparatus. Moreover, while sealing the body portion to prevent spill and/or evaporation of the nail polish fluid and/or one or more of its components from the body portion, the coupling strength of the detachable cover to the body portion may be significantly low (e.g. 1G) thus requiring significantly low detachment force. The automated nail polish application apparatus may therefore be equipped with significantly lower cost actuators having limited detachment force thus reducing the overall size and hence reducing the cost of the nail polish application apparatus.

In an optional implementation form of the first and/or second aspects, the kit further comprises a locking element rigid along a longitudinal axis of the one or more nail polish capsules when mechanically and detachably fastening the detachable cover to the body portion and limiting a movement of the non-screw detachable cover with respect to the body portion in the longitudinal axis. The significantly low mechanical coupling strength used to couple the detachable cover to the body portion may be insufficient when the capsule is exposed to various environmental conditions, for example, increased heat, low pressure, high pressure and/or the like. The locking element prevent the movement of the detachable cover sealing the body portion may allow the kit to be stored, shipped and/or handled under extreme environmental conditions without compromising sealing of the body portion.

In a further implementation form of the first and/or second aspects, the locking element is a rigid container storing the one or more nail polish capsules, a first wall of the container is in physical contact with an external surface of a bottom of the body portion and a second wall of the container opposite the first wall is in physical contact with an external surface of a top of the non-screw detachable cover. The rigid container may efficiently limit movement of the detachable cover with respect to the body portion. Moreover, the nail polish capsule(s) may be easily collected, extracted and/or removed from the container, either manually by a user and/or automatically by the nail polish application apparatus. Furthermore, the container may serve as a packaging form of the capsules for storage, shipping and/or delivery.

In a further implementation form of the first and/or second aspects, the locking element is connected to a first mechanical locking provision disposed on at least part of a rim of the non-screw detachable cover and to a second mechanical locking provision disposed on at least part of a perimeter wall of the body portion. Using the mechanical locking provisions available by in the nail polish capsule, either in the detachable cover and/or in the body portion may allow efficient and/or simple application of a plurality of locking elements for limiting the movement of the detachable cover with respect to the body portion.

In a further implementation form of the first and/or second aspects, the locking element is a wrapping sheet wrapped at least partially around the first mechanical locking provision and the second mechanical locking provision, wherein the wrapping sheet is detachable by one or more of: peeling the wrapping sheet and tearing a tearing line disposed in the wrapping sheet. The wrapping sheet may efficiently limit movement of the detachable cover with respect to the body portion. The wrapping sheet may typically be very low cost as well as simple to apply thus reducing the cost and/or complexity of nail polish capsule, the kit and/or the manufacturing process of the kit.

In a further implementation form of the first and/or second aspects, the locking element comprises one or more removable clips, the one or more removable clips are removed by one or more of: detaching, moving, rotating, pressing, bending and breaking the one or more removable clip. The clip(s) may efficiently limit movement of the detachable cover with respect to the body portion. The clip(s) may typically be very low cost as well as simple to apply thus reducing the cost and/or complexity of nail polish capsule, the kit and/or the manufacturing process of the kit.

In a further implementation form of the first and/or second aspects, the locking element comprises a first magnet mechanically coupled to the body portion and a second magnet mechanically to the non-screw detachable cover, a magnetic field induced between the first magnet and the second magnet fastens the non-screw detachable cover to the body portion. The magnets may efficiently limit movement of the detachable cover with respect to the body portion. The magnets may simplify the detachment process which may be required by the nail polish application apparatus since the detachment may involve creating and/or removing a magnet field which may not involve moving elements thus reducing complexity and/or increasing reliability of the nail polish application apparatus.

In a further implementation form of the first and/or second aspects, the locking element comprises a breakable adhesive material fastening the detachable cover to the upper face, the breakable adhesive material is breakable by one or more of: turning, bending, pushing and breaking the detachable cover. The breakable adhesive material may efficiently limit movement of the detachable cover with respect to the body portion. The breakable adhesive material may present a low cost solution for locking the detachable cover to the body portion.

In a further implementation form of the first and/or second aspects, the locking element comprises a breakable inner locking element fastening the detachable cover to the upper face. The breakable inner locking element is breakable by bending a neck section of the body portion. The breakable inner locking element may efficiently limit movement of the detachable cover with respect to the body portion.

In a further implementation form of the first and/or second aspects, the nail polish applying element comprises a stem and a dispensing head, a first end of the stem connects to a bottom face of the non-screw detachable cover and a second end of the stem connects to the dispensing head, wherein the stem protrudes into the body portion when the non-screw detachable cover is attached to the upper face. The nail polish applying element is shaped for efficient and simple dipping of the dispensing head in the nail polish fluid contained in the body portion. This may significantly simplify the design of the nail polish application apparatus in particular with respect to maneuvering the nail polish applying element to collect the nail polish fluid.

In an optional implementation form of the first and/or second aspects, one or more of the nail polish capsules further comprising one or more sealing elements mechanically coupled to one or more of: the upper face, a neck section of the body portion and the stem. The sealing element(s) may significantly improve sealing of the body portion to prevent spill, evaporation and/or diffusion of the nail polish fluid and/or one or more components of the nail polish fluid (e.g. a solvent etc.) from the body portion.

In a further implementation form of the first and/or second aspects, the dispensing head is constructed of one or more members of a group consisting of: a plurality of hair strands, an elastic tube, a solid pipe, a sponge, a wiper, a spray head and a combination of at least two thereof. This may allow flexible implementation, design, construction and/or production of the dispensing head optionally according to the type and/or characteristics of the nail polish fluid to be sued with each specific dispensing head.

In an optional implementation form of the first and/or second aspects, a width of the stem is adapted to at least partially contact one or more inner circumferential walls of a neck section of the body portion to form a resting area for laying down the detachable cover integrated with the nail polish applying element in the body portion. Providing the rest area may significantly simplify the design and/or production of the nail polish application apparatus by avoiding the need to have the resting area as part of the nail polish application apparatus itself.

In an optional implementation form of the first and/or second aspects, one or more of the nail polish capsules are wrapped in a sealed rippable foil sheet. The sealed rippable foil sheet may further prevent spill, evaporation and/or diffusion of the nail polish fluid and/or one or more components of the nail polish fluid (e.g. a solvent etc.), in particular during storage, handling and/or shipping of the kit.

In a further implementation form of the first and/or second aspects, the nail polish fluid is a member selected from a group consisting of: a nail polish fluid, a base coating fluid, a top coating fluid, a drying material, a nail art polish fluid and a medical nail treatment fluid. Supporting a wide variety of nail polish fluids may allow targeting a wide range of customer market segments, users and/or nail polish applications processes, techniques and/or the like thus making the automated nail polish application apparatus coupled with the nail polish capsules an attractive and efficient alternative for nail polishing.

In an optional implementation form of the first and/or second aspects, the non-screw detachable cover further comprising one or more mechanical mounting provisions shaped for grasping the non-screw detachable cover by a mounting element of the nail polish application apparatus, the one or more mechanical mounting provisions are members of a group consisting of: a protrusion, a groove and a cavity. The mechanical mounting provisions may significantly simplify the design of the nail polish application apparatus which may take advantage of the mechanical mounting provisions to accurately and/or easily collect, grasp, lock and/or secure the detachable cover.

In a further implementation form of the first and/or second aspects, the body portion further comprising one or more mechanical docking provisions shaped for locking the body portion in a capsule chamber of the nail polish application apparatus, the one or more mechanical docking provisions are members of a group consisting of: a protrusion, a groove and a cavity. The mechanical docking provisions may significantly simplify the design of the nail polish application apparatus which may take advantage of the mechanical mounting provisions to accurately and/or easily collect, grasp, lock and/or secure the body portion.

In an optional implementation form of the second aspect, the producing further comprising producing one or more sealing elements and mechanically coupling the one or more sealing elements to one or more of:

The upper face.

A neck section of the body portion.

A stem of the integrated nail polish applying element connecting a dispensing head of the integrated nail polish applying element to the non-screw detachable cover.

The sealing element(s) may significantly improve sealing of the body portion to prevent spill, evaporation and/or diffusion of the nail polish fluid and/or one or more components of the nail polish fluid (e.g. a solvent etc.) from the body portion.

In an optional implementation form of the second aspect, the producing further comprising producing a locking element and mechanically and detachably coupling the locking element to fasten the non-screw detachable cover to the body portion. Wherein the locking element is rigid along a longitudinal axis of the one or more nail polish capsules to limit a movement of the non-screw detachable cover with respect to the body portion in the longitudinal axis. The locking element prevent the movement of the detachable cover sealing the body portion may allow the kit to be stored, shipped and/or handled under extreme environmental conditions without compromising sealing of the body portion.

In an optional implementation form of the second aspect, the producing further comprising wrapping one or more of the nail polish capsules in a sealed rippable foil sheet prior to the inserting. The sealed rippable foil sheet may further prevent spill, evaporation and/or diffusion of the nail polish fluid and/or one or more components of the nail polish fluid (e.g. a solvent etc.), in particular during storage, handling and/or shipping of the kit.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 4 is a longitudinal view of a third exemplary embodiment of a kit for use by a nail polish application apparatus, according to some embodiments of the present invention;

FIG. 5B is a longitudinal view of a fifth exemplary embodiment of a kit for use by a nail polish application apparatus, according to some embodiments of the present invention;

FIG. 7 is a longitudinal view of a seventh exemplary embodiment of a kit for use by a nail polish application apparatus, according to some embodiments of the present invention;

FIG. 8A presents side and longitudinal cross section views of a first exemplary embodiment of a nail polish fluid storage and dispensing capsule for use by a nail polish application apparatus, according to some embodiments of the present invention;

FIG. 8B presents side and longitudinal cross section views of a second exemplary embodiment of a nail polish fluid storage and dispensing capsule for use by a nail polish application apparatus, according to some embodiments of the present invention;

FIG. 9 is a longitudinal cross section view including exemplary dimensions of a second exemplary embodiment of a nail polish fluid storage and dispensing capsule for use by a nail polish application apparatus, according to some embodiments of the present invention;

FIG. 10A and FIG. 10B are longitudinal cross section views of a second exemplary embodiment of a nail polish fluid storage and dispensing capsule for use by a nail polish application apparatus, according to some embodiments of the present invention;

FIG. 11 presents longitudinal cross section views of exemplary nail polish applying elements of a nail polish fluid storage and dispensing capsule, according to some embodiments of the present invention;

FIG. 13A, FIG. 13B, FIG. 13C and FIG. 13D are longitudinal cross section views of an exemplary nail polish fluid storage and dispensing capsule during a sequence of inserting a nail polish applying integrated with a detachable cover of the capsule into a body portion of the capsule, according to some embodiments of the present invention.

DETAILED DESCRIPTION OF EMBODIMENTS OF THE INVENTION

Figure 1:
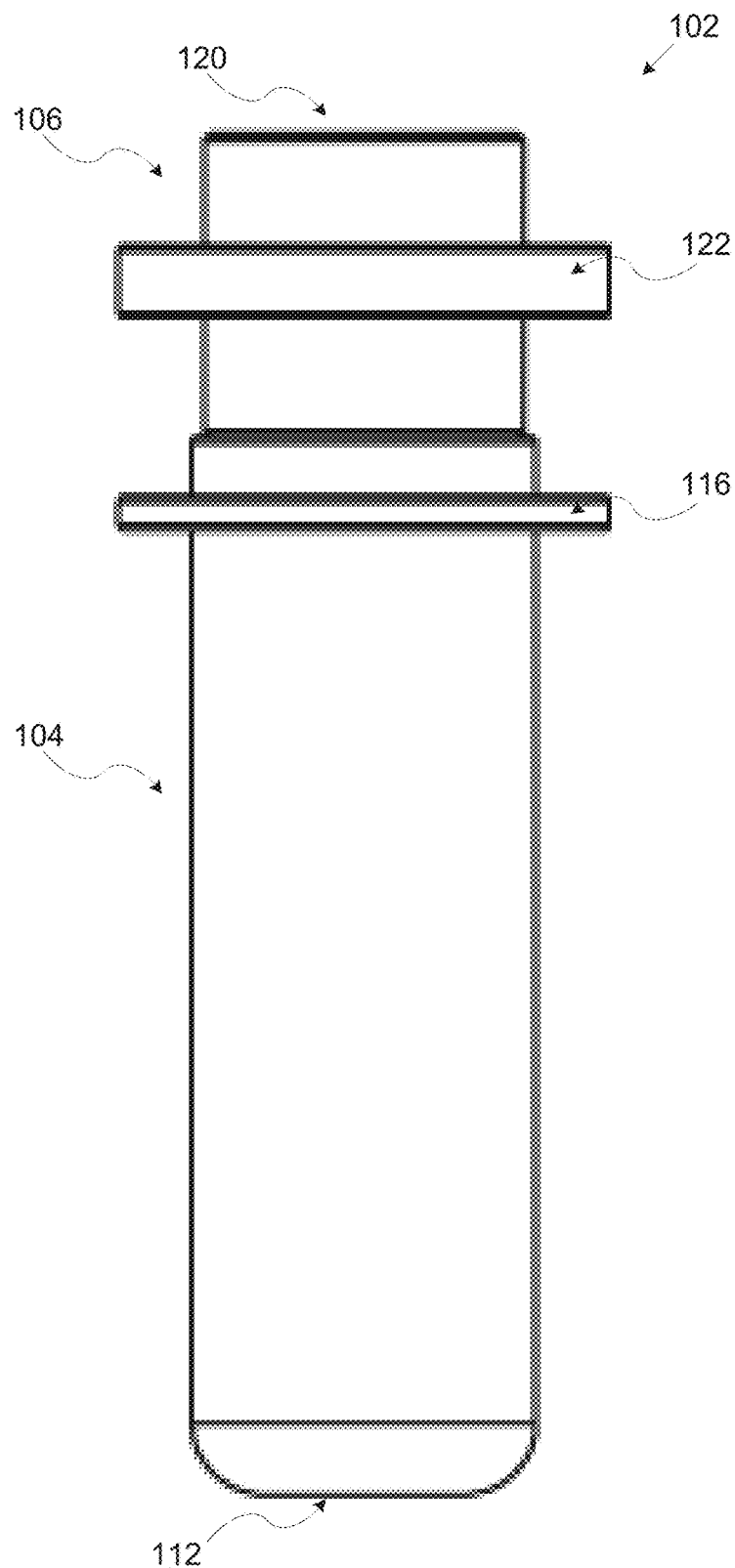
FIG. 1 is a longitudinal view of an exemplary nail polish fluid storage and dispensing capsule for use by a nail polish application apparatus, according to some embodiments of the present invention.
Figure 2A:
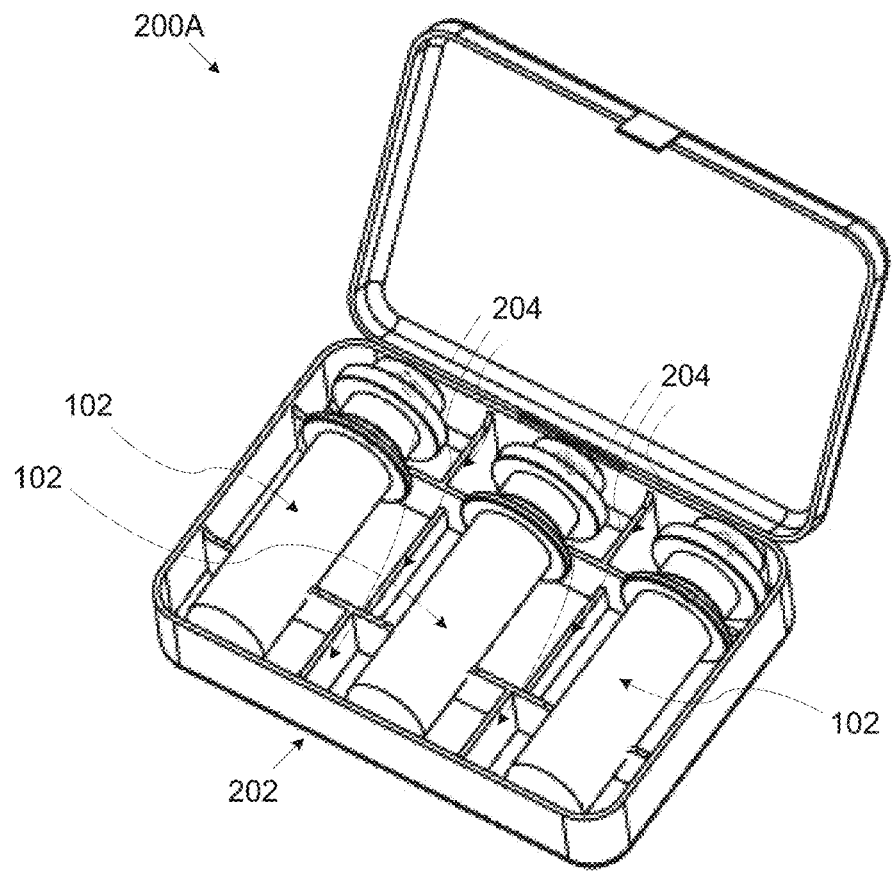
FIG. 2A, FIG. 2B, FIG. 2C and FIG. 2D are perspective and cross section views of a first exemplary embodiment of a kit for use by a nail polish application apparatus, according to some embodiments of the present invention.
Figure 2B:
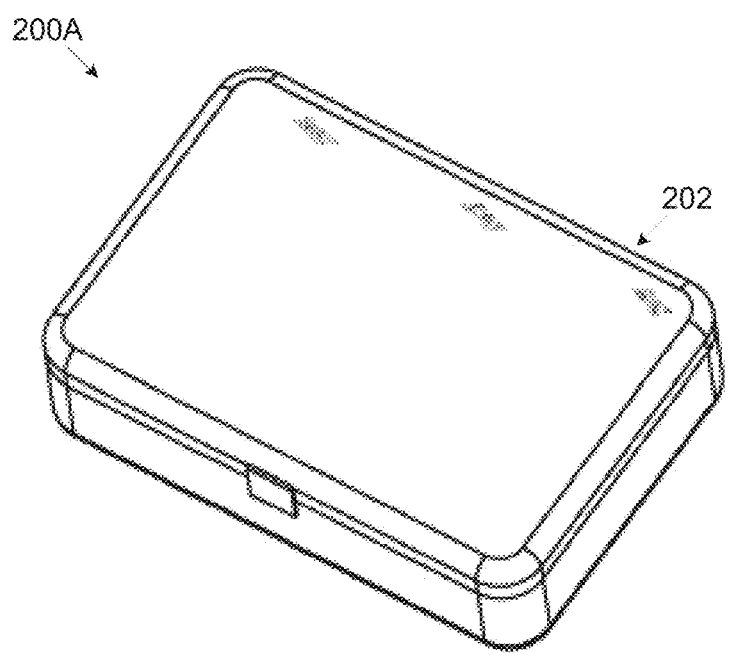
Figure 2C:
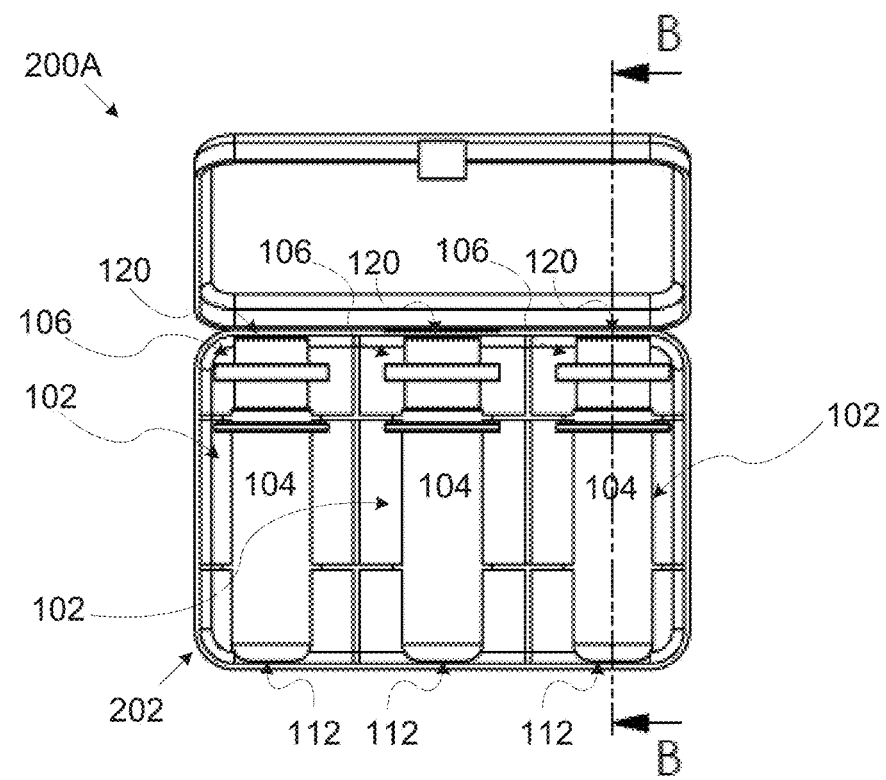
Figure 2D:
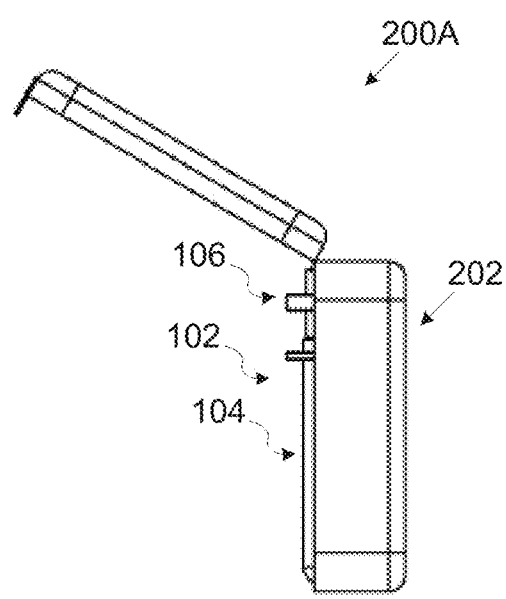

The present invention, in some embodiments thereof, relates to a kit for usage by an automated nail polish application apparatus and, more particularly, but not exclusively, to a kit comprising one or more nail polish capsules for usage by an automated nail polish application apparatus.

According to some embodiments of the present invention there is provided a kit and methods for producing the kit which comprises one or more storage and dispensing capsules, in particular two-part capsule(s) having a body portion containing nail polish fluid and a detachable cover integrated with a nail polish applying element for use by an automated nail polish application apparatus. The kit may further include a detachable (e.g. moveable, removable, breakable, tear-able, rippable, bendable, rotatable, etc.) locking element physically fastening the detachable cover to the body portion to limit movement of the detachable cover sealing an opening in an upper face of the body portion and prevent spill and/or evaporation of the nail polish fluid and/or one or more of its components from the body portion.

The nail polish applying element integrated with the detachable cover may be constructed of a stem protruding from a bottom face of the detachable cover and a dispensing head for applying the nail polish fluid to one or more nail surfaces of a user's fingers and/or toes. A length of the stem is adapted to a longitudinal dimension of the body portion such that when attaching the detachable cover to the upper face of the body portion, the dispensing head is dipped in the nail polish fluid contained in the body portion.

The capsule(s) which may typically be disposable capsule(s) intended for a single application of the nail polish fluid may be used with one or more automated nail polish application apparatuses. The nail polish application apparatus typically includes one or more elements, for example, a capsule compartment (chamber), a mounting element, an actuator, a control unit and/or the like for automatically grasping the capsule(s), detaching the detachable cover from the body portion, maneuvering the integrated nail polish applying element and/or the like. The capsules(s) may therefore include one or more mechanical mounting provisions, for example, a protrusion, a groove, a cavity and/or the like to support the nail polish application apparatus to collect, grasp, lock and/or the like of the detachable cover and/or the body portion. Similarly, the capsule may include one or more mechanical docking provisions, for example, a protrusion, a groove, a cavity and/or the like to support docking and/or securing the capsule and/or the body portion in a capsule compartment of the nail polish application apparatus.

Optionally, the capsule(s) include one or more sealing elements, for example, an axial sealing element, a radial sealing element and/or the like for improved sealing of the opening in the body portion of the capsule. The sealing element(s) may be mechanically coupled, disposed and/or integrated with the detachable cover, the stem of the integrated nail polish applying element and/or the upper face of the body portion. The sealing element(s) may be produced of a material having a high elasticity coefficient such that after mechanically coupling the detachable cover with the body portion, the sealing element(s) seal the opening in the upper face of the body portion to prevent the nail polish fluid from spilling, flowing and/or evaporating from the body portion.

The detachable cover may be mechanically coupled to the body portion using one or more techniques, methods and/or implementations, for example, press-fit, clamping, clasping, fastening, gluing and/or the like. However, the detachable cover is a non-screw detachable cover meaning that is not screwed to the body portion and hence no rotation operation(s) of the detachable cover and/or of the body portion is required to detach the detachable cover from the body portion.

The datable cover may be mechanically coupled to the body portion with a predefined strength and/or force, for example, 1G which may suffice for sealing the body portion 104 while handling the capsule(s) and/or while preparing it for a nail polish application session. The mechanical coupling strength which may translate to the required detachment force may be set to be significantly low (e.g. 1G).

However, the predefined and significantly low mechanical coupling strength may not be sufficient for sealing the body portion while additional pressure is built inside the body portion. Such pressure may be built due to one or more ambient environmental conditions the capsule(s) are subject to, for example, a pressure, a temperature and/or the like which may affect one or more characteristics of the nail polish fluid contained in the body portion, for example, a volume, a density and/or the like. The changes in the nail polish fluid characteristics may create the internal pressure in the body portion which may threaten the integrity of the mechanical coupling of the detachable cover to the body portion, i.e. the detachable cover may move to some degree thus failing to properly seal the body portion.

To overcome this, the detachable locking element (comprising one or more elements) which is rigid at least in a longitudinal axis of the capsule is applied to fasten the detachable cover to the body portion and limit movement of the detachable cover with respect to the body portion in the longitudinal axis of the capsule. Where the longitudinal axis is the axis in which the detachable cover is attached and/or detached from the body portion. The detachable locking element which locks the detachable cover to the body portion of the capsule(s) may be removed in order to open the capsule. The detachable locking element may be detached by the user and/or automatically by the nail polish application apparatus using one or more detachment techniques, for example, moving, removing, breaking, tearing, ripping, cutting, bending, rotating and/or the like.

In some embodiments, the detachable locking element may be facilitated by a rigid container adapted to the dimensions of the capsule(s). The dimensions of the container may be defined, adapted, configured and/or constructed according to the dimensions of the capsule(s), in particular in the longitudinal axis when the capsule is in closed state in which the detachable cover is mechanically coupled to the body portion. For example, a distance between opposite walls of the container may be set such that when the capsule(s) are inserted in the container in longitudinal positioning, one of the walls of the container is in physical contact with an external surface of a bottom face of the body portion and an opposite wall is in physical contact with the external surface of a top face of the detachable cover. Since the opposite walls of the containers are in physical contact with the bottom face of the body portion and the top face of the detachable cover and due to the fact that the container is rigid, movement of the detachable cover in the longitudinal axis is limited and typically completely prevented. Optionally, the container includes one or more mechanical elements, for example, an internal wall, a protrusion, a grove, a cavity and/or the like for arranging, guiding and/or securing the capsules in designated locations during and/or after inserting the capsules into the container. The container may further include a cover that may prevent the capsules from moving, falling and/or shifting from their designated locations.

In some embodiments, the body portion and/or the detachable cover include one or more mechanical locking provisions, for example, a protrusion, a groove, a cavity and/or the like to support applying the detachable locking element(s) to fasten the detachable cover and/or the body portion.

For example, the detachable locking element may include a wrapping sheet having one or more tearing lines which is physically connected to the mechanical locking provision(s) available in the detachable cover and/or the body portion. For example, the wrapping sheet may connect to a mechanical protrusion disposed on at least part of a rim of the detachable cover and to a mechanical protrusion disposed on at least part of a circumferential wall of the body portion, in particular around the top of the body portion next to the coupling area to the detachable cover. As such the wrapping sheet prevents movement of the detachable cover with respect to the body portion in the longitudinal axis. Tearing the tearing line(s) may release the connection between the detachable cover and the body portion thus allowing detachment of the detachable cover from the body portion.

In another example, the detachable locking element may include one or more detachable clips which may be placed for example, using the mechanical locking provisions to fasten the detachable cover to the body portion. For example, the clip(s) may be placed over the mechanical protrusion of the detachable cover and the mechanical protrusion of the body portion. As such the clip(s) prevent movement of the detachable cover with respect to the body portion in the longitudinal axis of the capsule. Detaching the clip(s) may release the connection between the detachable cover and the body portion thus allowing detachment of the detachable cover from the body portion.

In another example, one or more detachable locking elements may be formed as part of a container storing the capsule(s) such that when inserting the capsule(s) into their designated locations, the locking element(s) are in physical contact with the mechanical locking provisions of the detachable cover and the body portion, for example, the mechanical protrusion of the detachable cover and the body portion.

Optionally, one or more of the capsules are wrapped in a sealed rippable foil sheet, for example, a metal foil, a polymeric foil and/or the like in order to prevent spill and/or evaporation of the nail polish fluid and/or one or more materials composing the nail polish fluid, for example, a solvent and/or the like.

The nail polish application kit may present significant advantages. First, the kit may be easily used by an automated nail polish application apparatus since attachment/detachment of the detachable cover to the body portion is not utilized by a screwing mechanism hence no complex rotation and/or screwing operations and/or mechanisms are required by the nail polish application apparatus. This may significantly reduce the complexity and/or cost of the nail polish application apparatus. Moreover, the capsule(s), the detachable cover and/or the body portion are constructed to include the mechanical mounting provision(s) and/or the mechanical docking provision(s) supporting the nail polish application apparatus to collect, grasp, lock and/or the like of the detachable cover and/or the body portion.

Moreover, the significantly low (e.g. 1G) mechanical coupling strength of the detachable to the body portion may translate to significantly low detachment force required to detach the detachable cover. Therefore the automated nail polish application apparatus may be equipped with significantly lower cost actuators having limited detachment force thus reducing the overall size and hence reducing the cost of the nail polish application apparatus.

Furthermore, while the significantly low mechanical coupling strength may be insufficient when the capsule is exposed to various environmental conditions, the design and adaptation of the locking element to prevent the movement of the detachable cover sealing the body portion may allow the kit to be stored, shipped and/or handled under extreme environmental conditions without compromising sealing of the body portion.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

A kit comprising one or more nail polish fluid storage and dispensing capsules optionally having one or more locking elements for sealing the capsule(s) as described herein the present invention may be used by a nail polish application apparatus for applying the nail polish fluid to nail surfaces of a user. However, a person skilled in the art may use the same concepts described throughout the present invention for a capsule used for a plurality of other film forming applications, for example, coloring, applying protective layer(s), applying fluid and/or water resistance layer(s) and/or the like.

Several embodiments of the nail polish fluid storage and dispensing capsule are described hereinafter. However the presented embodiments should not be construed as limiting. A person skilled in the art may implement, construct, arrange and/or produce the capsules and/or parts thereof through multiple other implementations, structures, shapes, production methods and the like which employ the same concepts described throughout the present invention. Moreover, while one or more of the capsule's features may be described hereinafter for one or more of the embodiments, the features may be applicable for other embodiments as well even when not explicitly stated.

Referring now to the drawings, FIG. 1 is a longitudinal view of an exemplary nail polish fluid storage and dispensing capsule for use by a nail polish application apparatus, according to some embodiments of the present invention. An exemplary nail polish storage and dispensing capsule 102 may be a disposable capsule intended for a single application of nail polish on nail surface(s) of the user, for example, hand finger nails and/or foot toe nails. The capsule 102 may be used with one or more nail polish application apparatuses which control the actual nail polish application process. The nail polish application apparatus is not in the scope of the present invention.

The capsule 102 may be a two-part capsule constructed of a body portion 104, typically a flask shaped body portion and a detachable cover (cap) 106 attached and/or mechanically coupled to the body portion 104 to seal an opening in an upper face of the body portion 104. The body portion 104 may be constructed in one of a plurality of shapes, for example, a cylinder, a cone, a pyramid, a box, a cup shape and/or the like. The body portion 104 defines a reservoir containing the nail polish fluid, for example, a polish fluid, a base coating fluid, a top coating fluid, a drying material a nail art polish fluid, a medical nail treatment fluid and/or the like. A bottom face of the body portion 104, specifically an external surface of the bottom face of the body portion 104 is designated by numeral 112 and a top face of the detachable cover 106, specifically the external surface of the top face of the detachable cover 106 is designated by numeral 120.

The body portion 104 and the detachable cover 106 may be produced from one or more materials, for example, a polymer, glass, metal, a ceramic material and/or the like.

The body portion 104 and/or detachable cover 106 may be air sealed to prevent the nail polish fluid from contacting the air. Optionally, the body portion 104 and/or the detachable cover 106 may be produced from one or more materials characterized by a low permeability coefficient to prevent one or more components of the nail polish fluid, for example, solvents from diffusing and evaporating over time.

The detachable cover 106 is integrated with nail polish applying element which may be mechanically coupled and/or integrated to the detachable cover 106, typically to a bottom face of the detachable cover 106 such that when the capsule 102 is in closed state in which the detachable cover 106 is attached to the body portion, the nail polish applying element protrudes into the body portion 104.

The detachable cover 106 may be mechanically coupled to the body portion 104 through one or more techniques, methods and/or implementations, for example, press-fit, clamping, clasping, fastening, gluing and/or the like. However, the detachable cover 106 is a non-screw detachable cover meaning it is not screwed to the body portion 104 and hence no screw and/or rotation operation(s) of the detachable cover 106 and/or of the body portion 104 is required to detach and/or attach the detachable cover 106 from the body portion 104.

The detachable cover 106 may be attached and/or mechanically coupled to the body portion 104 with a predefined strength and/or force which may suffice for sealing the body portion 104 while handling the capsule(s) 102 and/or while preparing for the nail polish application session. Strength of the mechanical coupling between the detachable cover 106 and the body portion 104 may be predefined, for example, in terms of detachment force, for example, 1G. However, the predefined mechanical coupling strength may not be sufficient to prevent movement of the detachable cover 106 and compromise sealing of the opening in the body portion 104 when additional internal pressure is built in the reservoir defined by the body portion 104 which contains the nail polish fluid. Such internal pressure may be built due to a change in one or more characteristics of the nail polish fluid 150 contained in the reservoir, for example, a volume, a density and/or the like which may result from one or more ambient environmental conditions of the capsule(s) 102, for example, a pressure, a temperature and/or the like.

In order to limit the movement of the detachable cover 106 induced by the internal pressure in the reservoir defined by the body portion 104, one or more detachable locking elements may be applied to fasten the detachable cover 106 to the body portion 104. Detaching the detachable locking element(s) from the capsule 102 may be done using one or more detaching implementations, for example, removing, moving, rotating, bending, breaking, tearing, ripping, twisting and/or the like.

The body portion 104 and/or the detachable cover 106 may be shaped, constructed, designed and/or adapted to include one or more mechanical locking provisions, for example, a protrusion, a grove, a cavity and/or the like to support the detachable locking element(s) applied for fastening of the detachable cover 106 to the body portion 104. In the detachable cover 106, the mechanical locking provision(s) may be disposed, for example, on at least part of a rim of the detachable cover 106. In the body portion 104, the mechanical locking provisions may be disposed, for example, on at least part of a circumferential wall of the body portion 104. For example, the detachable cover 106 may be shaped, constructed and/or produced to include a mechanical protrusion 122 around its rim. Similarly, the body portion may be shaped, constructed and/or produced to include a mechanical protrusion 116 on the external surface around at least part of the external surface of one or more circumferential walls of the body portion 104, in particular in around the top of the body portion 104 next to a coupling area to the detachable cover 106.

The structure, design and/or configuration of the locking element(s) as well as methods, techniques and/or implementations of applying the locking element(s) to fasten the detachable cover 106 to the body portion 104 may vary. Some exemplary embodiments are presented hereinafter, however other alternative implementations, designs and/or structures may exist and the presented embodiments should not be construed as limiting.

Reference is now made to FIG. 2A, FIG. 2B, FIG. 2C and FIG. 2D, which are perspective and cross section views of a first exemplary embodiment of a kit for use by a nail polish application apparatus, according to some embodiments of the present invention. An exemplary kit 200A comprises a rigid container 202 storing one or more nail polish fluid storage and dispensing capsules such as the capsule 102, for example, three capsules 102. The container 202 serves as the locking element fastening a detachable cover such as the detachable cover 106 to a body portion such as the body portion 104 while the capsule(s) 102 are inserted in the container 202. Extracting the capsule(s) 102 from the container 202 may translate to removing the locking element.

The dimensions of the container 202 may be defined, adapted, configured and/or constructed according to the dimensions of the capsule(s) 102 when in closed state, i.e. the detachable cover 106 is mechanically coupled and/or attached to the body portion 104. For example, a distance between opposite walls of the container 202 may be set such that when the capsule(s) 102 are inserted in the container 202 in longitudinal positioning, a first wall of the container 202 is in physical contact with a lower face of the body portion 104 such as the lower face 112 and a second wall of the container 202 opposite the first wall is in physical contact with a top face of the detachable cover 106 such as the top face 120. Since the opposite walls of the container 202 are in physical contact with the lower face 112 and top face 120, movement of the detachable cover 106 with respect to the body portion 104 in the longitudinal axis is limited and/or completely prevented.

The container 202 may include one or more mechanical storage provisions 204, for example, an internal wall, a protrusion, a grove, a cavity and/or the like for arranging, guiding and/or securing the capsules 102 in designated locations during and/or after inserting the capsules 102 into the container 202. The container 202 may include a cover that when closed may prevent the capsules 102 from moving, falling and/or shifting from their designated locations in the container 202. The cover may significantly improve packaging, storage, shipping and/or handling of the kit 200A.

Figure 3:
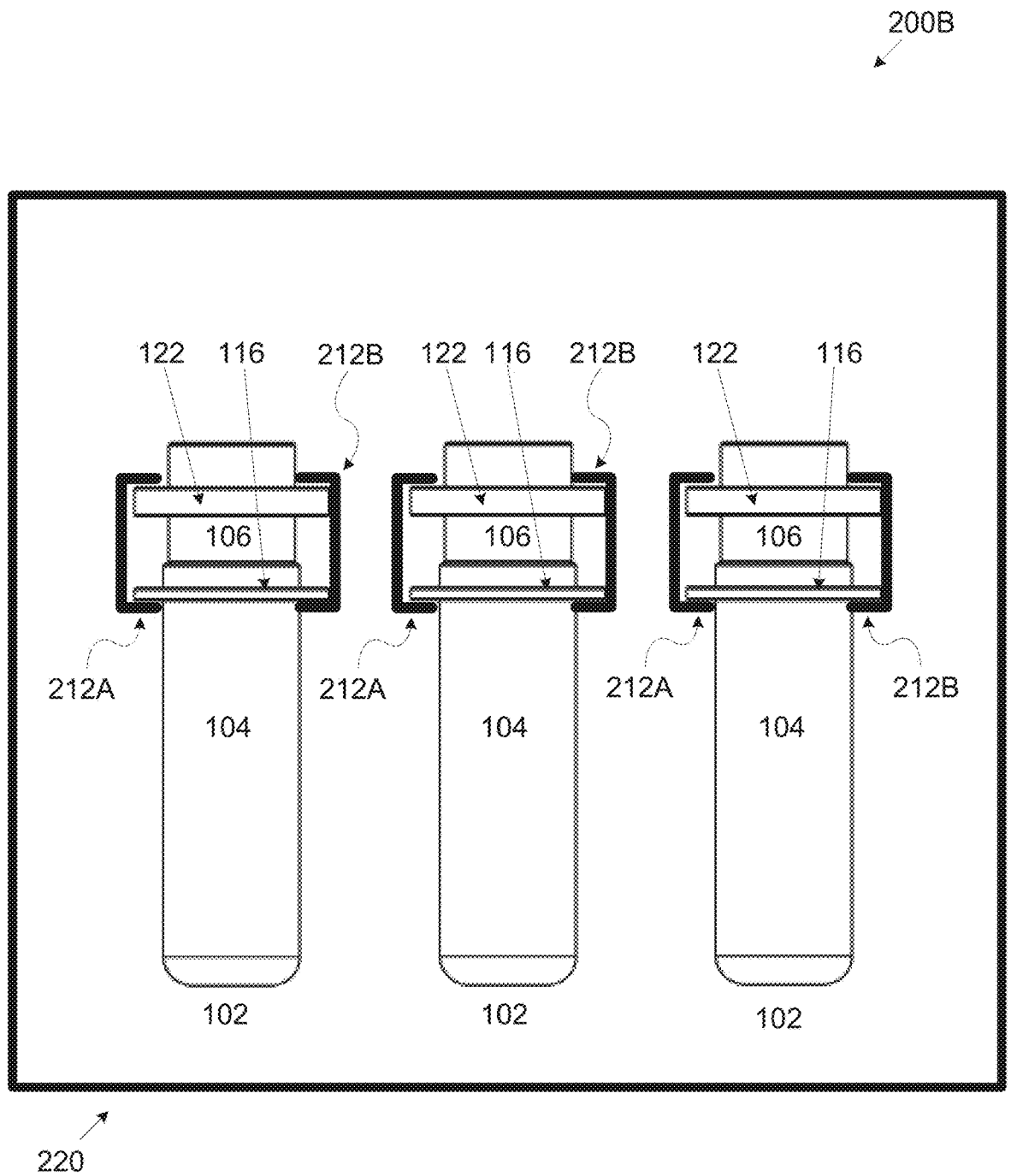
FIG. 3 is a longitudinal view of a second exemplary embodiment of a kit for use by a nail polish application apparatus, according to some embodiments of the present invention.

Reference is now made to FIG. 3, which is a longitudinal view of a second exemplary embodiment of a kit for use by a nail polish application apparatus, according to some embodiments of the present invention. An exemplary kit 200B comprises a container 220 storing one or more nail polish fluid storage and dispensing capsules such as the capsule 102, for example, three capsules 102, in particular two-part capsules 102 comprising a body portion such as the body portion 104 and a detachable cover such as the detachable cover 106. The container 220 may be shaped, adapted, configured and/or constructed to include one or more locking elements 212 serving as the locking element, for example, a barrier locking element 212A and a barrier locking element 212B for fastening the detachable cover 106 of each of the capsules 102 to the respective body portion 104 of each of the capsules 102. One or more of the barrier locking elements 212A and 212B may be formed as part of the container 220 such that the barrier locking elements 212A and 212B are integral parts of the container 220. However other mechanical coupling techniques, for example, welding, gluing, press-fit and/or the like.

The dimensions of the container 220 and/or the dimensions and/or location(s) of the barrier locking elements 212 as well as relative distances between the barrier locking elements 212 are defined, and set according to the dimensions of the capsule(s) 102 when in its closed state. In particular with respect to the mechanical locking provisions available in the detachable cover 106 and/or the body portion 104, for example, a mechanical protrusion such as the protrusion 122 of the detachable cover 106 and a mechanical protrusion such as the protrusion 116 of the body portion 104.

For example, the dimensions of the barrier locking elements 212A and 212B and distances between the barrier locking elements 212A and 212B may be configured according to the dimensions and distances of the protrusion 122 and the protrusion 116. When inserting the capsule(s) 102 into their designated locations, each pair of the barrier locking elements 212A and 212B may be in physical contact with the mechanical locking provisions 122 and 116.

In another example, the container 220 may be shaped, adapted, configured and/or constructed to include only part of the barrier locking elements 212A and/or 212B while utilizing one or more external walls of the container 220 as an additional locking element. For example, the container 220 may be shaped and/or constructed to include a barrier locking elements 212 which is in physical contact with the upper surface of the protrusion 122 and/or with the external surface of the top face of the detachable cover 106 such as the top face 120 while an external wall is in physical contact with the external surface of the bottom face of the body portion 104 such as the lower face 112.

After inserted in their designated locations, the barrier locking element(s) 212, for example, the barrier locking elements 212A and/or 212B prevent movement of the detachable cover 106 with respect to the body portion 104, in particular in the longitudinal axis of the capsule 102. Removing the capsule(s) 102 from the container 220 may release the connection between the detachable cover 106 and the body portion 104 thus allowing detachment of the detachable cover 106 from the body portion 104.

Optionally, the container 220 includes one or more mechanical storage provisions such as the mechanical storage provision 204, for example, an internal wall, a protrusion, a grove, a cavity and/or the like for arranging, guiding and/or securing the capsules 102 in designated locations during and/or after inserting the capsules 102 into the container 202. The container 220 may include a cover that when closed may prevent the capsules 102 from moving, falling and/or shifting from their designated locations in the container 202.

Reference is now made to FIG. 4, which is a longitudinal view of a third exemplary embodiment of a kit for use by a nail polish application apparatus, according to some embodiments of the present invention.

An exemplary kit 200C1 comprises one or more capsules such as the capsule 102, each locked with a respective wrapping sheet 222A serving as the locking element. The wrapping sheet 222A is significantly rigid, at least in the longitudinal axis of the capsule 102.

The wrapping sheet 222A may be placed and/or applied over at least part of the body portion 104 and the detachable cover 106 to fasten and lock the detachable cover 106 to the body portion 104. In particular, for efficient and/or robust locking, the wrapping sheet 222A may be placed to physically connect to one or more of the mechanical locking provisions available in the body portion 104 and/or the detachable cover 106. For example, the wrapping sheet 222A may be applied over a mechanical protrusion such as the protrusion 122 disposed on at least part of the rim of the detachable cover 106 and to a mechanical protrusion such as the protrusion 116 disposed on at least part of the circumferential wall of the body portion 104. In particular, to minimize the size of the wrapping sheet 222A and hence increase reliability and/or longevity of the wrapping sheet 222A, the protrusion 116 may be disposed around the top of the circumferential wall of the body portion 104 next to the coupling area to the detachable cover 106.

After placed over the body portion 104 and the detachable cover 106, the wrapping sheet 222A prevents movement of the detachable cover 106 with respect to the body portion 104, in particular in the longitudinal axis of the capsule 102. Breaking, for example, peeling, removing, tearing and/or cutting the wrapping sheet 222A may release the connection between the detachable cover 106 and the body portion 104 thus allowing detachment of the detachable cover 106 from the body portion 104.

Another exemplary embodiment 200C2 utilizes a wrapping sheet 222B having one or more tearing lines 224 to ease and/or simplify tearing of the wrapping sheet 222B in order to break the connection between the detachable cover 106 and the body portion 104. The wrapping sheet 222B may be placed and/or applied to the body portion 104 and the detachable cover 106 similarly to the wrapping sheet 222A. Breaking, for example, peeling, tearing, cutting and/or the like the tearing line(s) 224 of the wrapping sheet 222B may release the connection between the detachable cover 106 and the body portion 104 thus allowing detachment of the detachable cover 106 from the body portion 104.

Breaking the wrapping sheet 222A and/or the wrapping sheet 222B may be done manually by the user and/or automatically by the nail polish application apparatus. For example, the nail polish application apparatus may include a cutting element, in particular a sharp cutting element, for example, a razor shaped element, a blade and/or the like designed to cut the wrapping sheet 222A and/or the wrapping sheet 222B.

Figure 5A:
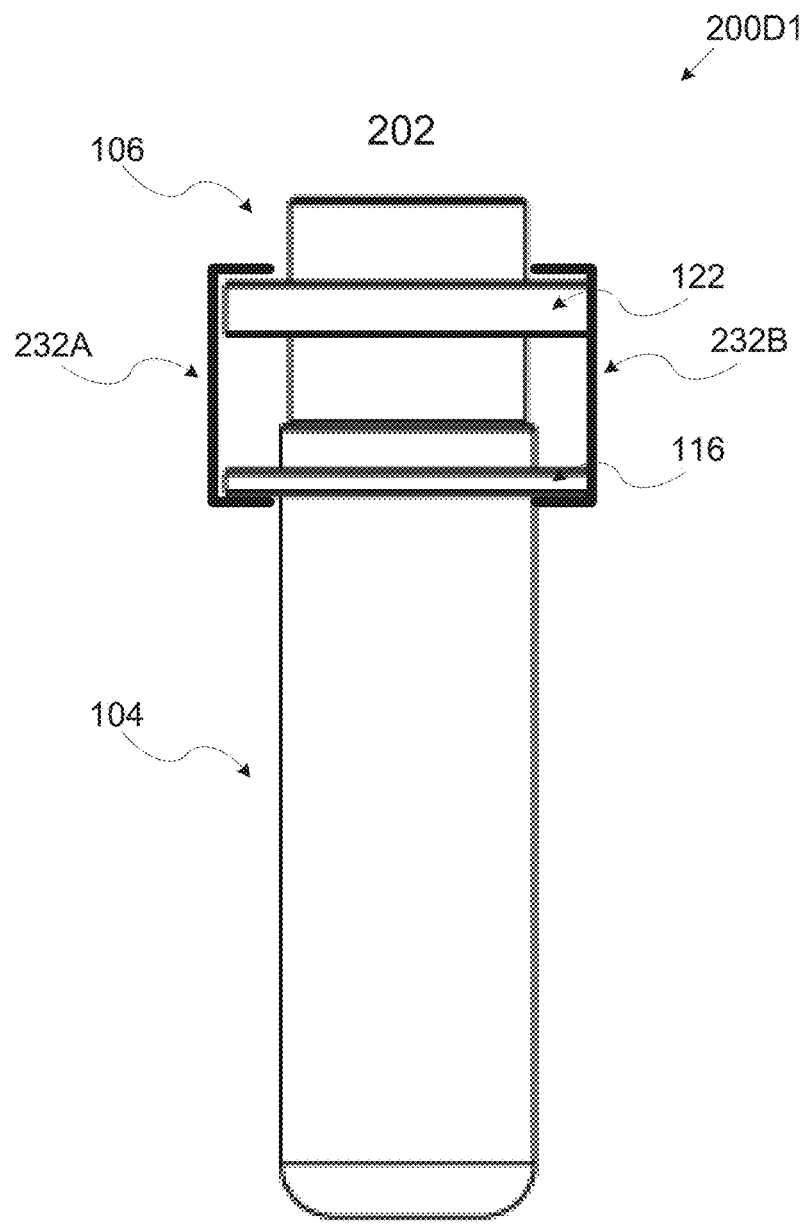
FIG. 5A is a longitudinal view of a fourth exemplary embodiment of a kit for use by a nail polish application apparatus, according to some embodiments of the present invention.

Reference is now made to FIG. 5A, which is a longitudinal view of a fourth exemplary embodiment of a kit for use by a nail polish application apparatus, according to some embodiments of the present invention. An exemplary kit 200D1 comprises one or more capsules such as the capsule 102, each locked with one or more clips 232, for example, a clip 232A and a clip 232B serving as locking elements. The clips 232A and 232B are significantly rigid, at least in the longitudinal axis of the capsule 102. The clips 232A and 232B may be detached through one or more detachment operations, for example, twisting, rotating, pressing, extracting, releasing, breaking and/or the like which may be performed manually by the user and/or automatically by the nail polish application apparatus.

The clips 232A and/or 232B may be placed and/or applied to fasten the detachable cover 106 to the body portion 104, in particular, for efficient and/or robust locking, the clips 232A and/or 232B may be placed using one or more of the mechanical locking provisions available in the body portion 104 and/or the detachable cover 106. For example, the clips 232A and/or 232B may each be placed to physically contact a mechanical protrusion such as the protrusion 122 disposed on at least part of the rim of the detachable cover 106 and a mechanical protrusion such as the protrusion 116 disposed on at least part of the circumferential wall of the body portion 104. Moreover, to minimize the size of the clips 232A and/or 232B and hence increase reliability and/or longevity of the clips 232A and/or 232B, the protrusion 116 may be disposed around the top of the circumferential wall of the body portion 104 next to the coupling area to the detachable cover 106.

After placed to fasten the detachable cover 106 to the body portion 104, the clips 232A and/or 232B prevent movement of the detachable cover 106 with respect to the body portion 104, in particular in the longitudinal axis of the capsule 102. Removing the clips 232A and/or 232B may release the connection between the detachable cover 106 and the body portion 104 thus allowing detachment of the detachable cover 106 from the body portion 104.

Placing and removing the clips 232A and/or 232B may be implemented by one or more of a plurality of techniques. For example, the clips 232A and/or 232B may be simple significantly rigid clips designed, constructed and/or produced to fit with a predefined locking pressure over the mechanical locking provisions available in the body portion 104 and/or the detachable cover 106. In such case, the clips 232A and/or 232B may be placed by applying a predefined force to install the clips 232A and/or 232B over the mechanical locking provisions while removing the clips may be done by applying the predefined force to remove the clips 232A and/or 232B from the mechanical locking provisions. In another example, the clips 232A and/or 232B may be implemented as a two part clip having an upper part placed over the mechanical locking provisions available in the detachable cover 106 and a lower part placed over the mechanical locking provisions available in the body portion 104. After placed at their designated locations, the two parts of the clips 232A and/or 232B may be attached together using one or more implementations, for example, a rotatable screw mechanism, a breaking section, a tearing section, a rack and pinion mechanism and/or the like. detaching the two parts of the clips 232A and/or 232B from each other may be done according to the attachment implementations and may include, for example, rotating one or more of the two parts of the clips 232A and/or 232B (typically in opposite directions), breaking a breaking section, tearing a tearing section and/or the like.

Reference is now made to FIG. 5B, which is a longitudinal view of a fifth exemplary embodiment of a kit for use by a nail polish application apparatus, according to some embodiments of the present invention. An exemplary kit 200D2 comprises one or more capsules such as the capsule 102, each having one or more rotatable clips 232, for example, a clip 232C and a clip 232D serving as locking elements. Each of the rotatable clips 232C and 232D may connect to the body portion 104 at a single anchoring point supporting lateral movement of the rotatable clips 232C and 232D with respect to the body portion 104 and the detachable cover 106. The clips 232C and 232D are significantly rigid, in particular at least in the longitudinal axis of the capsule 102.

When in a closed state as shown in illustration 200D2_A, the rotatable clips 232A and/or 232B may fasten the detachable cover 106 to the body portion 104 to prevent movement of the detachable cover 106 with respect to the body portion 104, in particular in the longitudinal axis of the capsule 102. In particular, for efficient and/or robust locking, the rotatable clips 232C and/or 232D may contact one or more of the mechanical locking provisions available in the body portion 104 and/or the detachable cover 106. For example, the rotatable clips 232C and/or 232D may each be located to physically contact a mechanical protrusion such as the protrusion 122 disposed on at least part of the rim of the detachable cover 106 and a mechanical protrusion such as the protrusion 116 disposed on at least part of the circumferential wall of the body portion 104. Moreover, to minimize the size of the rotatable clips 232C and/or 232D and hence increase reliability and/or longevity of the clips 232C and/or 232D, the protrusion 116 may be disposed around the top of the circumferential wall of the body portion 104 next to the coupling area to the detachable cover 106.

When in an open state as shown in illustration 200D2_B, the rotatable clips 232C and/or 232D are rotated sideways around the anchoring point thus releasing the lock between the detachable cover 106 and the body portion 104. Rotating the rotatable clips 232C and/or 232D may be performed manually by the user and/or automatically by the nail polish application apparatus. For example, the nail polish application apparatus may be equipped with a capsule compartment in which the capsule 102 is placed for the nail polish session and/or part thereof. Initially, the rotatable clips 232C and/or 232D are in the closed state such that the detachable cover 106 is fastened to the body portion 104. The capsule compartment may be designed, constructed and/or configured to apply inward pressure to the bottom side of the rotatable clips 232C and/or 232D to rotate the rotatable clips 232C and/or 232D to the open state thus releasing the lock between the detachable cover 106 and the body portion 104. In another example, the nail polish application apparatus may use a moving element to press inwards the rotatable clips 232C and/or 232D to rotate the rotatable clips 232C and/or 232D to the open state.

Figure 6:
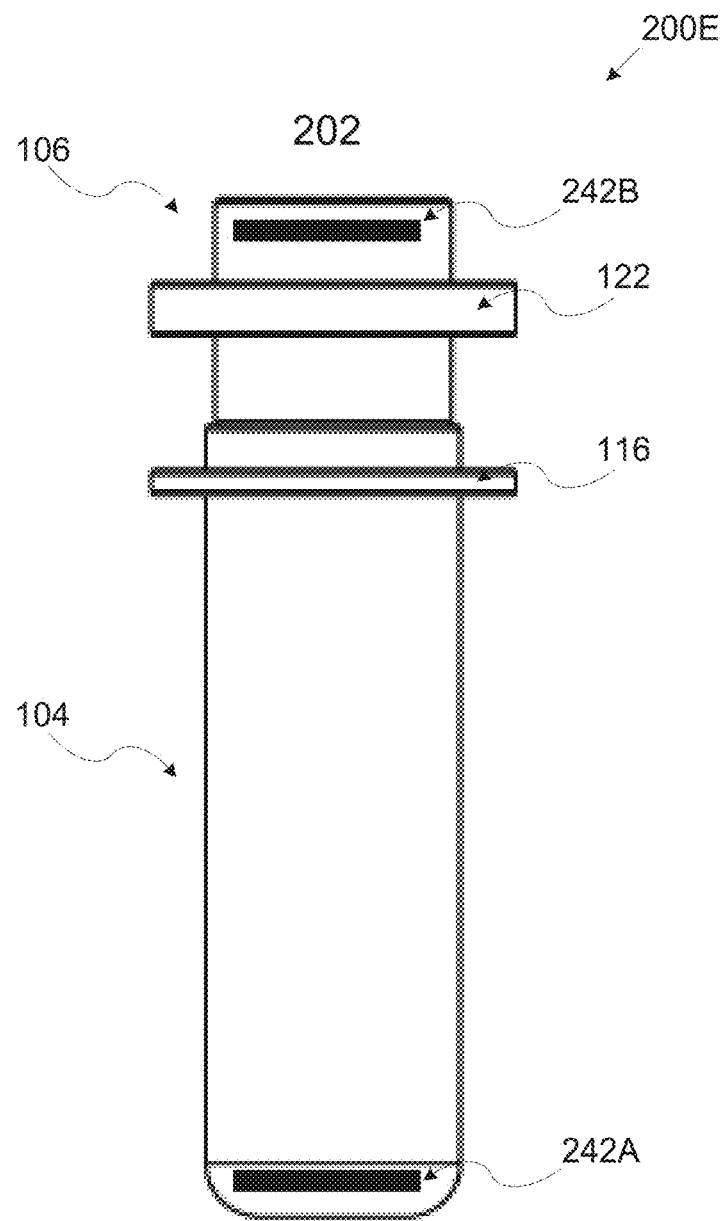
FIG. 6 is a longitudinal view of a sixth exemplary embodiment of a kit for use by a nail polish application apparatus, according to some embodiments of the present invention.

Reference is now made to FIG. 6, which is a longitudinal view of a sixth exemplary embodiment of a kit for use by a nail polish application apparatus, according to some embodiments of the present invention. An exemplary kit 200E comprises one or more capsules such as the capsule 102, each locked with one or more pairs of magnets 242 serving as locking elements, for example, a first magnet 242A mechanically coupled to a body portion such as the body portion 104 and a second magnet 242B mechanically coupled to a detachable cover such as the detachable cover 106. The first magnet 242A and the second magnet 242 are configured, constructed and mechanically coupled to the body portion 104 and the detachable cover 106 respectively to induce a magnetic field applying an attraction force to attract the first magnet 242A to the second magnet 242. The magnetic field may therefore fasten the detachable cover 106 to the body portion 104 to prevent movement of the detachable cover 106 with respect to the body portion 104, in particular in the longitudinal axis of the capsule 102.

The automated nail polish application apparatus may be designed and/or equipped with means for releasing the magnetic locking element, for example, magnetic means adapted to induce a suitable magnetic field. For example, assuming the capsule 102 is placed in a capsule compartment of the automated nail polish application apparatus. A magnetic field induced from the bottom of the capsule compartment, i.e. around the lower face 112 the body portion 104 may apply a counter magnetic force which may cancel the magnetic field induced by the first magnet 242A thus releasing the lock between the detachable cover 106 and the body portion 104.

Reference is now made to FIG. 7, which is a longitudinal view of a seventh exemplary embodiment of a kit for use by a nail polish application apparatus, according to some embodiments of the present invention. An exemplary kit 200F comprises one or more capsules such as the capsule 102, each locked with a breakable inner locking element 252 mechanically coupled to both a detachable cover such as the detachable cover 106 and a body portion such as the body portion 104. As shown in illustration 200F_A, the breakable inner locking element 252 fastens the detachable cover 106 to the body portion 104 to prevent movement of the detachable cover 106 with respect to the body portion 104, in particular in the longitudinal axis of the capsule 102. As shown in illustration 200F_B, breaking the breakable inner locking element 252 may release the lock between the detachable cover 106 and the body portion 104.

One or more implementations may be applied for breaking the breakable inner locking element 252, for example, bending, twisting, rotating, pressing, pulling and/or the like. For example, the body portion 104 may be produced at least partially of a material having a high elasticity coefficient allowing bending, pressing and/or twisting at least part of the body portion 104. For example, a neck section 105 of the body portion 104 may be produced at least partially of a material having a high elasticity coefficient. The neck section 105 may therefore be bent sideways, i.e. perpendicularly to the longitudinal axis of the capsule 102 thus breaking the breakable inner locking element 252. In another example, the detachable cover 106 may be pressed downwards thus causing the neck section 105 to fold, crumple and/or collapse thus breaking the breakable inner locking element 252. Breaking the breakable inner locking element 252 may be done manually by the user and/or automatically by the nail polish application apparatus.

In another exemplary embodiment of the kit used by the nail polish application apparatus, the locking element fastening the detachable cover 106 to the body portion 104 may be utilized using a breakable adhesive material. The breakable adhesive material may be applied, for example, to an upper face of the body portion 104, to a lower face of the detachable cover 106, to both and/or the like such that the breakable adhesive material may prevent movement of the detachable cover 106 with respect to the body portion 104, in particular in the longitudinal axis of the capsule 102. One or more implementations may be applied for breaking the adhesive material, for example, bending, twisting, rotating, pressing, pulling and/or the like. For example, the detachable cover 106 may be shaped to have a ledge at its lower face which allows pressing down the detachable cover 106 in the longitudinal axis with respect to the body portion 104. One or more of the inner faces of the ledge may be applied with the breakable adhesive material thus locking the detachable cover 106 to the body portion 104. Pressing down the detachable cover 106 may break the breakable adhesive material thus releasing the lock between the detachable cover 106 to the body portion 104. Breaking the breakable adhesive material may be done manually by the user and/or automatically by the nail polish application apparatus.

Figure 8C:
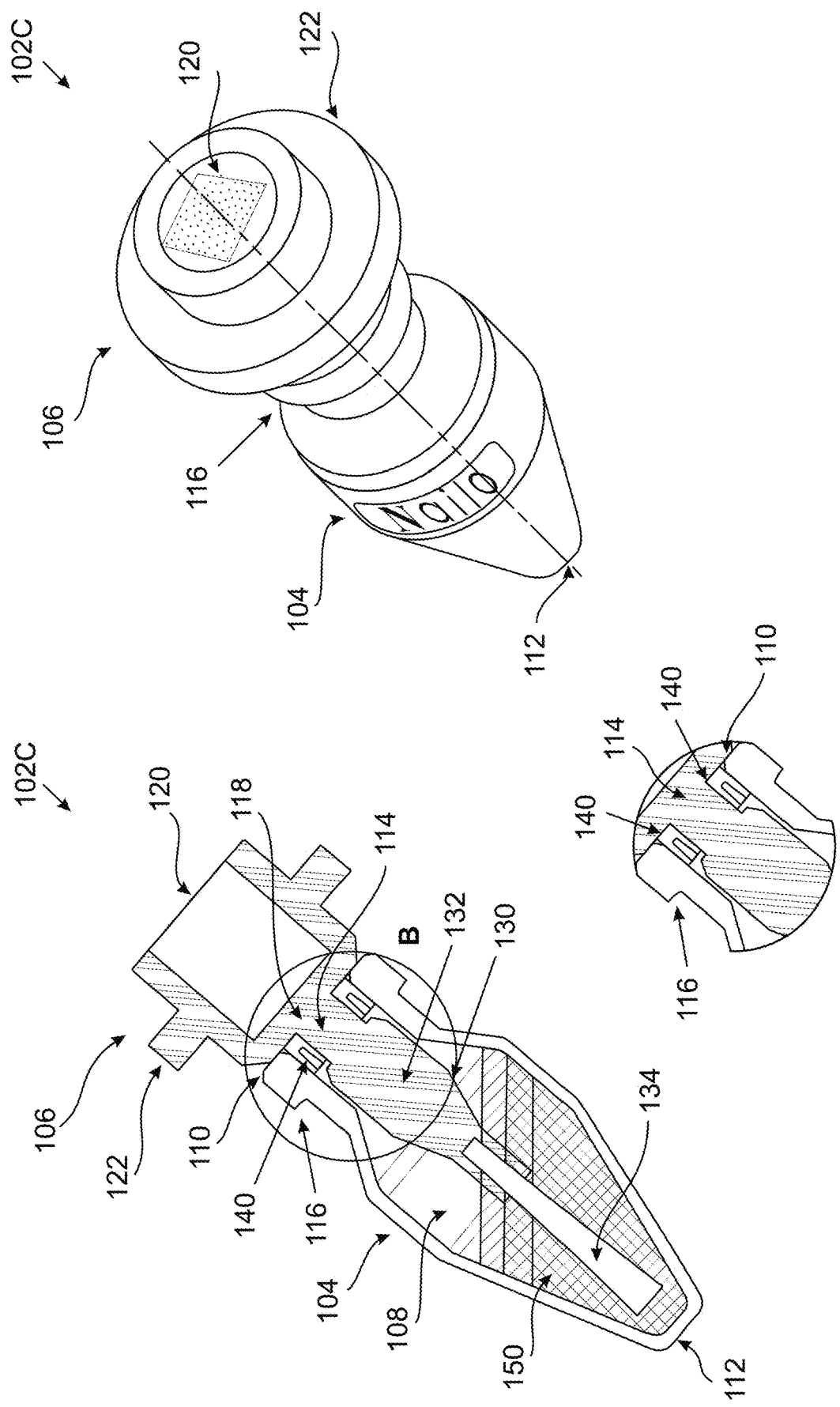
FIG. 8C presents side and longitudinal cross section views of a third exemplary embodiment of a nail polish fluid storage and dispensing capsule for use by a nail polish application apparatus, according to some embodiments of the present invention.

Reference is now made to FIG. 8A, FIG. 8B and FIG. 8C, which present side and longitudinal cross section views of exemplary embodiments of a nail polish fluid storage and dispensing capsule for use by a nail polish application apparatus, according to some embodiments of the present invention. FIG. 8A, FIG. 8B and FIG. 8C present three exemplary embodiments 102A, 102B and 102C respectively of a nail polish fluid storage and dispensing capsule such as the capsule 102. The capsules 102A, 102B and 102C collectively referred herein after as the capsule 102 apply the same design and/or implementation concepts while presenting various construction alternatives, naturally other construction alternatives exist and the presented embodiments should not be construed as limiting.

The exemplary two-part capsule 102 (e.g. the capsule 102A, the capsule 102B and/or the capsule 102C) may be constructed with a body portion such as the body portion 104, typically a flask shaped body portion containing a nail polish fluid 150 and a detachable cover (cap) such as the detachable cover 106 attached and/or mechanically coupled to the body portion 104 to seal an opening 114 in an upper face 110 of the body portion 104. The body portion 104 defines a reservoir 108 containing a nail polish fluid 150, for example, a polish fluid, a base coating fluid, a top coating fluid, a drying material a nail art polish fluid, a medical nail treatment fluid and/or the like.

A nail polish applying element 130 integrated with the detachable cover 106 may typically be constructed of a stem 132 and a dispensing head 134. A first end of the stem 132 is mechanically coupled and/or integrated to the bottom face 118 of the detachable cover 106 while a second end of the stem 132 is mechanically coupled and/or integrated with the dispensing head 134. The stem 132 may be constructed, produced and/or designed to have a length adapted to the size of the body portion 104 such that when the detachable cover 106 is maneuvered to insert the nail polish applying element 130 into the reservoir 108, the dispensing head 134 dips in the nail polish fluid 150 contained in the reservoir 108.

As described before, the detachable cover 106 may be mechanically coupled to the body portion 104 through one or more techniques, methods and/or implementations, for example, press-fit, clamping, clasping, fastening and/or the like. However, the detachable cover 106 is a non-screw detachable cover meaning that is not screwed to the body portion 104 and hence no screw and/or rotation operation(s) of the detachable cover 106 and/or of the body portion 104 is required to detach and/or attach the detachable cover 106 from the body portion 104. For example, a width and/or perimeter of a bottom face 118 of the detachable cover 106 may be shaped, designed, configured and/or constructed to fit into the opening 114 with a predefined force level. When the detachable cover 106 is pressed into the opening 114, the perimeter of the bottom face 118 is in physical contact with an inner surface of the circumferential walls of the body portion 104 such that the detachable cover 106 is mechanically coupled to the body portion 104 through the pressure maintained between the perimeter of the bottom face 118 and the inner surface of the circumferential walls of the body portion 104. The bottom face 118 may be further designed, configured and/or constructed to at least partially protrude into the reservoir 108 to control the contact surface between the perimeter of the bottom face 118 and the inner surface of the circumferential walls of the body portion 104.

Optionally, one or more sealing elements 140 are applied and/or disposed between the detachable cover 106 and the body portion 104 to seal the opening 114 when the detachable cover 106 is mechanically coupled and/or attached to the body portion 104. The sealing element(s) 140, for example, an axial sealing element, a radial sealing element and/or the like may be mechanically coupled and/or integrated with the detachable cover 106 and/or the body portion 104. For example, a perimeter sealing element 140 such as, for example, an O-ring, an annular ring and/or the like may be disposed around the perimeter of the bottom face 118 of the detachable cover 106. In another example, the sealing element(s) 140 is disposed around the stem 132 of the integrated nail polish applying element 130, in particular in proximity to the first end of the stem 132 such that the sealing element(s) 140 are in physical contact with the inner surface of the circumferential walls of the body portion 104 in the area of the opening 114. In another example, a perimeter sealing element 140 such as, for example, an annular ring may be disposed around the perimeter of the upper face 110 of the body portion 104. In another example, a perimeter sealing element 140 such as, for example, an annular ring, a U shaped sealing element and/or the like may be disposed at least partially around an inner circumferential wall of a neck section of the body portion 104 in close proximity to the opening 114. In such embodiments, the detachable cover 106 may be mechanically coupled to the body portion 104 by pressing the bottom face 118 into the body portion 104 such that the sealing element(s) 140 are pressed against the inner surface of the circumferential walls of the body portion 104. The sealing element(s) 140 may be produced of a material having a high elasticity coefficient such that after attaching the detachable cover 106 to the body portion 104, the sealing element(s) 140 may expand or compress accordingly to seal the opening 114 in the upper face 110 of the body portion 104 to prevent the nail polish fluid 150 from flowing out of the body portion 104. Moreover, the sealing element(s) 140 may be disposed on the detachable cover 106, the nail polish applying element 130 and/or the body portion 104 such that when attached to the body portion 104, a predefined clearance (air gap) is maintained between the bottom face 118 of the detachable cover 106 and the upper face 110 of the body portion 104 where the sealing element(s) 140 maintain the coupling to the body portion 104.

The sealing element(s) 140 may be designed, constructed and/or produced as a separate part(s), for example, the O-ring, the annular ring and/or the like. Optionally, the sealing element(s) 140 may be designed, constructed and/or produced as part of the body portion 104 and/or the nail polish applying element 130, for example, as an over-mold on the stem 132 as a secondary manufacturing step while injecting the stem 132.

As shown in a detailed view A in FIG. 8B and in a detailed view B in FIG. 8C, one or more of the sealing elements 140 may be designed, constructed and/or adapted as a U shaped sealing element having its opened side facing the reservoir 108.

Figure 8D:
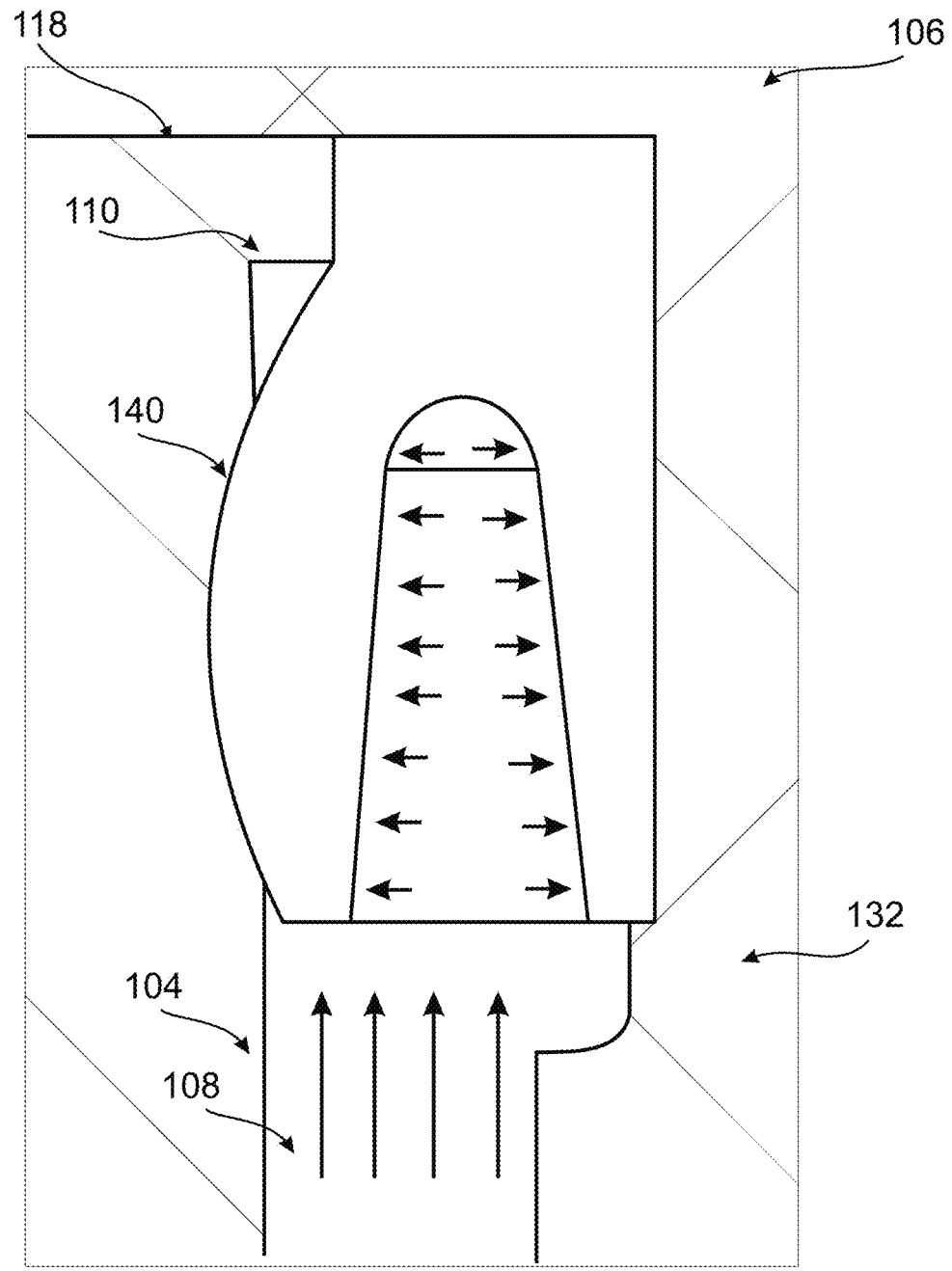
FIG. 8D is a longitudinal cross section view of an exemplary sealing element of a nail polish fluid storage and dispensing capsule for use by a nail polish application apparatus, according to some embodiments of the present invention.

Reference is also made to FIG. 8D which is a longitudinal cross section view of exemplary sealing element of a nail polish fluid storage and dispensing capsule for use by a nail polish application apparatus, according to some embodiments of the present invention. Due to one or more environmental conditions, for example, increased temperature, decreased pressure and/or the like, in which the nail polish liquid 150 and/or one or more of its compounds (e.g. solvents, etc.) may release one or more gases. In such case, the released gas(s) may typically expand in the reservoir 108 upwards towards the opening 114. The expanding gas(s) may travel into the U shaped sealing element(s) 140 and apply pressure from the inside of the U shaped sealing element(s) 140 on the external walls of the U shaped sealing element(s) 140. As result, the pressure between the external walls of the U shaped sealing element(s) 140 and the circumferential walls of the body portion 104 and/or the stem 132 may increase thus further improving sealing of the opening 114. When the environmental conditions change, for example, the temperature decreases, the volume of the released gas(s) may also decrease thus reducing the pressure applied by the travel of the gas(s) into the U shaped sealing element(s) 140. As result the pressure between the external walls of the U shaped sealing element(s) 140 and the circumferential walls of the body portion 104 and/or the stem 132 may also decrease. As seen, a predefined clearance (gap) is maintained between the datable cover 106 and the body portion 104, in particular between the bottom face 118 of the detachable cover 106 and the upper face 110 of the body portion 104. This clearance may allow some movement of the elastic U shaped sealing element(s) 140 during expansion and/or compression induced by the gas(s) released from the nail polish fluid 150.

Reference is now made to FIG. 9, which is a longitudinal cross section view including exemplary dimensions of a second exemplary embodiment of a nail polish fluid storage and dispensing capsule for use by a nail polish application apparatus, according to some embodiments of the present invention. FIG. 9 presents exemplary dimensions for a second embodiment of a nail polish fluid storage and dispensing capsule such as the embodiment 102B. The presented dimensions employ the metric system and all dimensions are expressed in millimeters. FIG. 9 further presents a detailed view C including exemplary dimensions of an exemplary sealing element such as the sealing element 140.

Figure 10A:
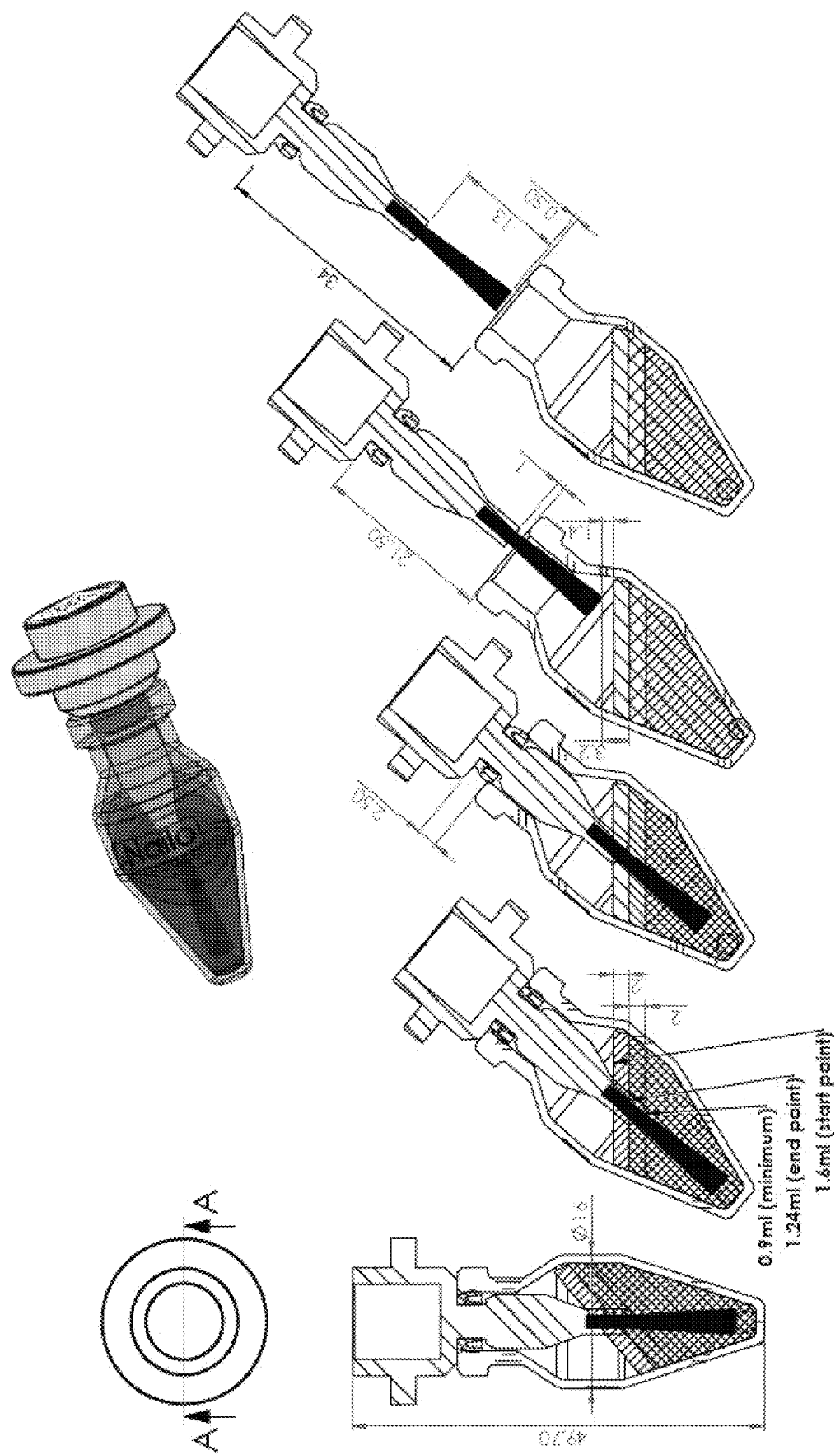

Reference is now made to FIG. 10A and FIG. 10B, is a longitudinal cross section view of a second exemplary embodiment of a nail polish fluid storage and dispensing capsule for use by a nail polish application apparatus, according to some embodiments of the present invention. FIG. 10A and FIG. 10B present exemplary dimensions for a third embodiment of a nail polish fluid storage and dispensing capsule such as the embodiment 102C. The presented dimensions employ the metric system and all dimensions are expressed in millimeters. FIG. 10B further presents a detailed view D including exemplary dimensions of an exemplary sealing element such as the sealing element 140.

The dispensing head 134 may comprise one or more materials and/or elements for dispensing the nail polish fluid, for example, a plurality of hair strands, an elastic tube(s), a solid pipe(s), a sponge, a wiper and/or the like. The dispensing head 134 may further comprise a combination of two or more of the dispensing materials and/or elements. When dipped in the nail polish fluid 150, the dispensing materials and/or elements collect a portion of the nail polish fluid 150 which may be applied to one or more nail surfaces of the user.

Reference is now made to FIG. 11, which presents longitudinal cross section views of exemplary nail polish applying elements of a nail polish fluid storage and dispensing capsule, according to some embodiments of the present invention. An exemplary nail polish applying element 130A such as the nail polish applying element 130 includes a stem such as the stem 132 and an exemplary dispensing head 134A such as the dispensing head 134 comprising a plurality of hair strands. When dipped in a nail polish fluid such as the nail polish fluid 150 contained in a reservoir such as the reservoir 108, the hair strands may be anointed and/or smeared with the nail polish fluid 150 thus collecting the nail polish fluid 150. An exemplary nail polish applying element 130B such as the nail polish applying element 130 includes a stem such as the stem 132 and an exemplary dispensing head 134B such as the dispensing head 134 comprising one or more elastic tubes. When dipped in the nail polish fluid 150, the elastic tube(s) may be anointed and/or smeared with the nail polish fluid 150 thus collecting the nail polish fluid 150. An exemplary nail polish applying element 130C such as the nail polish applying element 130 includes a stem such as the stem 132 and an exemplary dispensing head 134C such as the dispensing head 134 comprising one or more solid pipes. When dipped in the nail polish fluid 150, the solid tube(s) may be anointed and/or smeared with the nail polish fluid 150 thus collecting the nail polish fluid 150. Optionally, one or more of the solid pipes is hollow, for example, shaped as needle having an internal void along at least part of its longitudinal axis. When dipped in the nail polish fluid 150, the hollow solid pipe(s) may draw (suck) the nail polish fluid 150 into the internal space of the hollow solid pipe(s) thus collecting the nail polish fluid 150. An exemplary nail polish applying element 130D such as the nail polish applying element 130 includes a stem such as the stem 132 and an exemplary dispensing head 134D such as the dispensing head 134 comprising a sponge. When dipped in the nail polish fluid 150, the sponge may be soaked and/or drenched with the nail polish fluid 150 thus collecting the nail polish fluid 150. An exemplary nail polish applying element 130E such as the nail polish applying element 130 includes a stem such as the stem 132 and an exemplary dispensing head 134E such as the dispensing head 134 comprising a wiper. When dipped in the nail polish fluid 150, the wiper may be anointed and/or smeared with the nail polish fluid 150 thus collecting the nail polish fluid 150. An exemplary nail polish applying element 130F such as the nail polish applying element 130 includes a stem such as the stem 132 and an exemplary dispensing head 134F such as the dispensing head 134 comprising one or more spray heads. When dipped in the nail polish fluid 150, the spray head(s) may be filled with the nail polish fluid 150 thus collecting the nail polish fluid 150.

Reference is made once again to FIG. 8A, FIG. 8B and FIG. 8C.

The nail polish fluid storage and dispensing capsule 102 may be used by one or more nail polish application apparatuses, the description of which is out of scope of the present invention. However, some aspects relating to the interaction between the nail polish application apparatus(s) and the nail polish fluid storage and dispensing capsule 102 are described herein. For example, in order to facilitate the use of the capsule(s) 102 by the nail polish application apparatus(s) some mechanical mounting provisions may be applied in the capsule(s) 102. The mechanical mounting provision(s) may be used by the nail polish application apparatus(s) to secure, lock, grasp, hold, extract, shake, move and/or the like the capsule 102, the body portion 104 and/or the detachable cover 106. Similarly, some mechanical docking provisions may be applied in the capsule(s) 102 to support docking and/or securing the capsule and/or the body portion in a capsule compartment of the nail polish application apparatus.

In particular, the mechanical mounting provision(s) and/or the mechanical docking provisions may be applied to the body portion 104 and/or the detachable cover 106. For example, the detachable cover 106 may be shaped, constructed and/or produced to have one or more grooves at opposite sides of the external circumferential wall of the detachable cover 106 such that the mounting element (shaped accordingly) of the nail polish application apparatus(s) may grasp the detachable cover 106. In another example, the body portion 104 may be shaped, constructed and/or produced to have one or more grooves carved in the external circumferential wall of the body portion 104 such that body portion 104 may be secured, locked and/or the like in a capsule compartment (shaped accordingly) of the nail polish application apparatus(s).

In some embodiments, one or more of the mechanical locking provisions may be used as one or more of the mechanical mounting provisions and/or the mechanical docking provisions. For example, a mechanical protrusion such as the protrusion 122 which may encompass at least partially the rim of the detachable cover 106 may be used by a mounting element (shaped accordingly) of one or more nail polish application apparatuses for grasping the detachable cover 106. In another example, a mechanical protrusion such as the protrusion 116 which may encompass at least partially an external surface of one or more circumferential walls of the body portion 104 may be used to secure, lock and/or the like the body portion 104 in a capsule compartment (shaped accordingly) of the nail polish application apparatus(s).

Figure 12C:
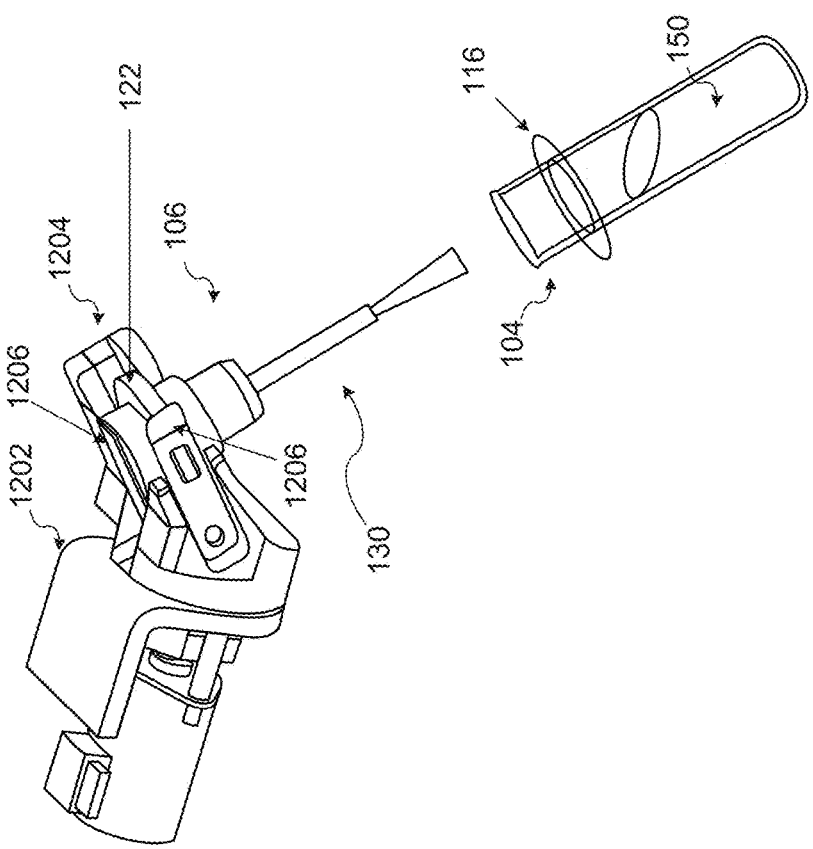
FIG. 12A, FIG. 12B and FIG. 12C are perspective side and front views of an exemplary mounting element of a nail polish application apparatus using a nail polish capsule retrieved from a kit comprising one or more nail polish fluid storage and dispensing capsules, according to some embodiments of the present invention.
Figure 12A:
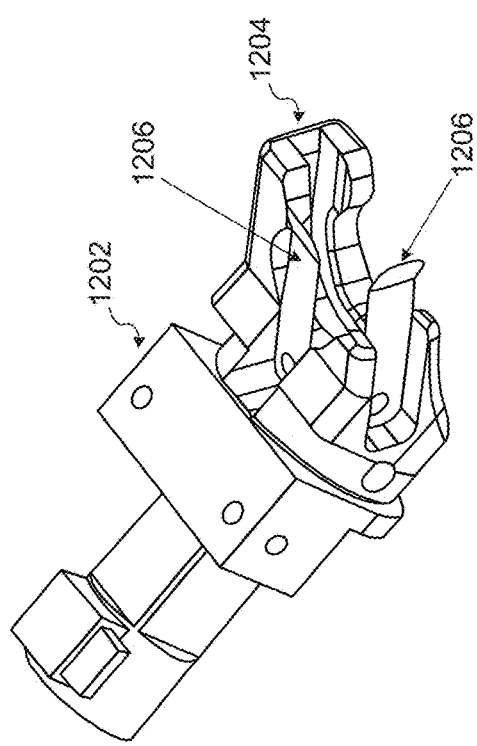
Figure 12B:
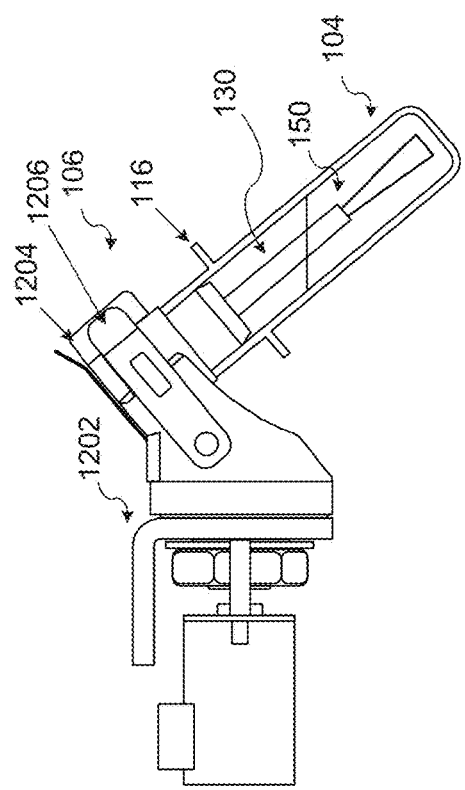

Reference is now made to FIG. 12A, FIG. 12B and FIG. 12C, which are perspective side and front views of an exemplary mounting element of a nail polish application apparatus using a nail polish capsule retrieved from a kit comprising one or more nail polish fluid storage and dispensing capsules, according to some embodiments of the present invention.

As shown in FIG. 12A, an exemplary mounting element 1202 of an exemplary nail polish application apparatus may include an exemplary fixture 1204 adapted to receive and accommodate a detachable cover such as the detachable cover 106, in particular a detachable cover 106 integrated with a nail polish applying element such as the nail polish applying element 130. The fixture 1204 is adapted to ensure an accurate and/or repeatable mounting, positioning and/or locking of the detachable cover 106 in the mounting element 1202. For example, the fixture 1204 may comprise one or more leaf springs 1206, springs and/or the like adapted to receive and accommodate the mechanical mounting provision(s) disposed in the detachable cover 106, for example, a protrusion such as the protrusion 122. In another example, the fixture 1204 may include one or more magnets, electromagnets and/or the like adapted to attract a respective magnet(s), electromagnets and/or the like disposed in the detachable cover 106 as part of the mechanical mounting provisions.

As shown in FIG. 12B, the mounting element 1202 may be maneuvered by one or more actuators of the nail polish application apparatus to move the fixture 1204 to a capsule compartment (chamber) of the nail polish application apparatus hosting a two-part capsule such as the capsule 102. The capsule 102 comprising a detachable cover 106 such as the detachable cover 106 integrated with a nail polish applying element such as the nail polish applying element 130 and a body portion such as the body portion 104. The mounting element 1202 may be further maneuvered to move the fixture 1204 to grasp and optionally lock (secure) the detachable cover 106 in the fixture 1204 by locking to one or more of the mechanical mounting provisions available in the detachable head 106, such as, for example, the protrusion 122.

As shown in FIG. 12C, the mounting element 1202 may be maneuvered such that the detachable cover 106 locked in the fixture 1204 detaches from the body portion 104. Moreover, the mounting element 1202 may be maneuvered to move the integrated nail polish applying element 130 integrated with the detachable cover 106 locked in the fixture 1204 to a nail polish applying area of the nail polish application apparatus.

The mounting element 1202 may be further maneuvered to move the nail polish applying element 130 over one or more nail surfaces of the user to apply the nail polish fluid 150 to the nail surface(s) of the user.

The capsule(s) 102 may be further designed, shaped and/or constructed to simplify the operation of the nail polish application apparatus(s) during the nail polish application session, in particular to simplify the operation of maneuvering a mounting element such as the mounting element 1202 to insert the nail polish applying element 130 integrated with the detachable cover 106. Moreover, the capsule(s) 102 may be designed, shaped and/or constructed to serve as a resting area for temporarily laying down the detachable cover 106 on the body portion 104, in particular, placing the nail polish applying element 130 inside the body portion 104 to protect the nail polish applying element 130, to temporarily seal the opening in the body portion 104 and/or the like. such lay down may be required in case, for example, another capsule 102 is currently used, the nail polish session is paused, a malfunction of the nail polish applying apparatus is identified and/or the like. Reference is now made to FIG. 13A, FIG. 13B, FIG. 13C and FIG. 13D, which are longitudinal cross section views of an exemplary nail polish fluid storage and dispensing capsule during a sequence of inserting a nail polish applying integrated with a detachable cover of the capsule into a body portion of the capsule, according to some embodiments of the present invention. An exemplary nail polish fluid storage and dispensing capsule such as the capsule 102 includes a body portion such as the body portion 104 and a detachable cover such as the detachable cover 106 having an integrated nail polish applying element such as the nail polish applying element 130. A mounting element such as, for example, the mounting element 1202 may be maneuvered to grasp the detachable cover 106 and optionally lock it in a fixture such as the fixture 1204.

During a nail polish application session, the nail polish applying element 130 may need to temporarily be laid down. Moreover, the detachable cover 106 may need to be placed to temporarily seal an opening such as the opening 114 in the body portion 104. In addition, the nail polish applying element 130 may need to be inserted into the body portion 104 to dip a dispensing head such as the dispensing head 134 in a nail polish fluid such as the nail polish fluid 150 contained a reservoir such as the reservoir 108 defined by the body portion 104.

The detachable cover 106, the nail polish applying element 130 and/or the body portion 104 may therefore be designed, constructed and/or shaped to facilitate the body portion 104 as a resting area for the detachable cover 106 and optionally simplify insertion of the nail polish applying element 130 into the body portion 104. In particular, the detachable cover 106, the nail polish applying element 130 and/or the body portion 104 may therefore be designed, constructed and/or shaped to maintain the detachable cover 106 and the nail polish applying element 130 in parallel to the longitudinal axis of the body portion 104 while the nail polish applying element 130 is inserted into the body portion 104. Maintaining the parallel positioning may significantly simplify grasping of the detachable cover 106 by a mounting element such as the mounting element 1202 of the nail polish application apparatus. This may also improve the temporary sealing of the opening 114 while the nail polish applying element 130 is laid down.

For example, an exemplary stem such as the stem 132 of the nail polish applying element 130 may be shaped in a conic shape having an external diameter which is slightly smaller than a diameter of the inner circumferential walls of the body portion 104, in particular, the inner circumferential walls of a neck section of the body portion 104.

The mounting element 1202 may be maneuvered to insert the dispensing head 134 through the 114 in an upper face such as the upper face 110 of the body portion 104. While the mounting element 1202 is maneuvered to insert the dispensing head 134 into the reservoir 108, the conic shaped stem 132 may come in physical contact with at least part of one or more inner circumferential walls of the body portion 104 thus guiding the dispensing head 134 into the reservoir 108. The physical contact between the conic shaped stem 132 and the circumferential walls of the body portion 104 may allow temporarily laying down the detachable cover 106 on top the body portion 104 thus utilizing the body portion 104 as the resting area for the detachable cover 106 integrated with the nail polish applying element 130. Moreover, the conic design of the stem 132 may significantly reduce the accuracy level required to maneuver the mounting element 1202 for inserting the dispensing head 134 into the reservoir 108. The mounting element 1202 may be maneuvered to bring the dispensing head 134 to an approximate position in and/or over the opening 114 and start inserting the nail polish applying element 130 into the reservoir 108. While the nail polish applying element 130 advances into the reservoir 108, the conic shaped stem 132 may guide the nail polish applying element 130 to its accurate position to allow efficient dipping of the dispensing head 134 in the nail polish fluid 150.

Figure 14:
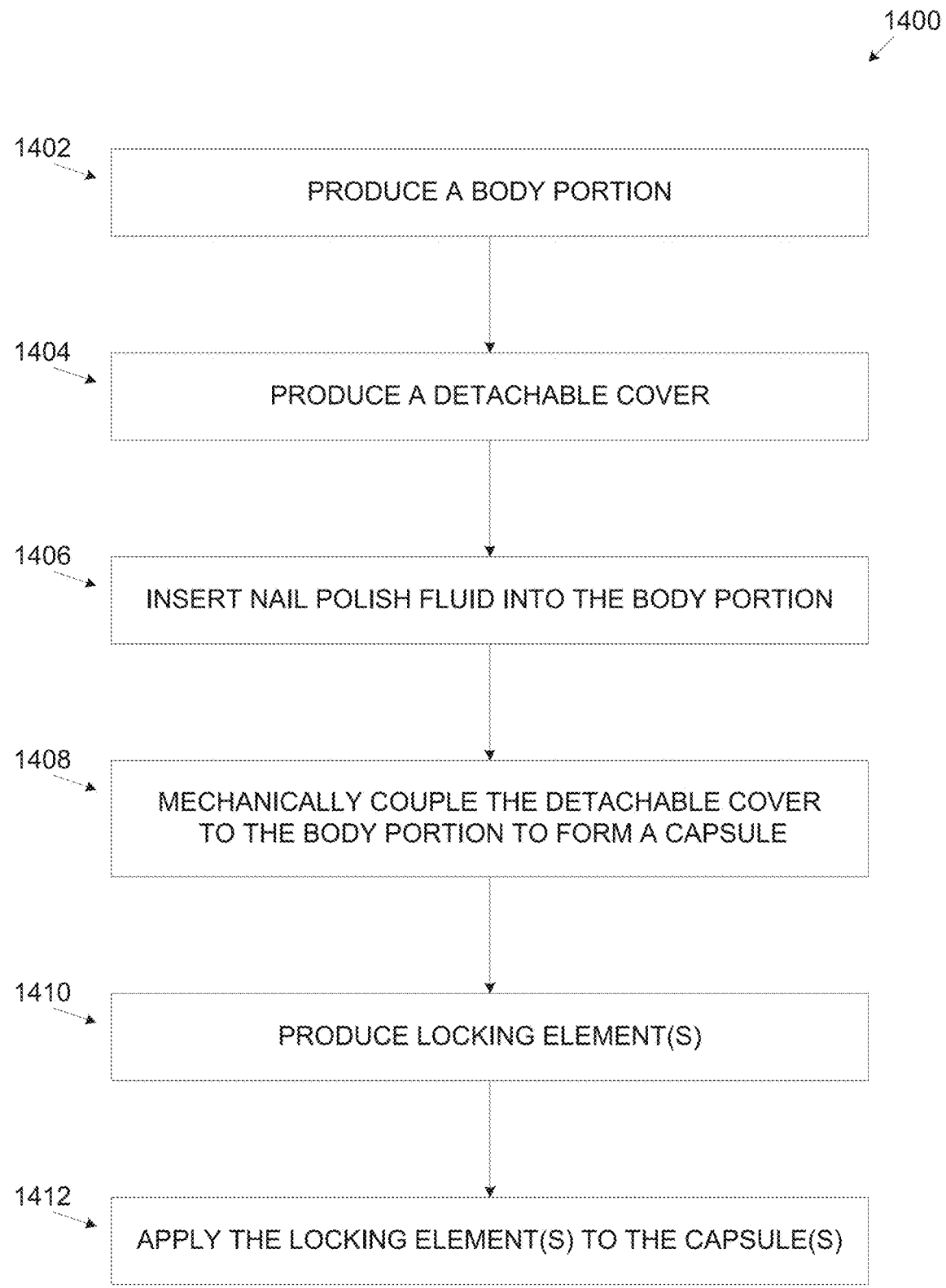
FIG. 14 is a flowchart of an exemplary process for producing an exemplary kit for use by a nail polish application apparatus, according to some embodiments of the present invention.

Reference is now made to FIG. 14, which is a flowchart of an exemplary process for producing an exemplary kit for use by a nail polish application apparatus, according to some embodiments of the present invention. An exemplary process 1200 may be applied to produce a kit such as, for example, the kits 200A, 200B, 200C1, 200C2, 200D1, 200D2, 200E and/or 200F for use by a nail polish application apparatus. The kit comprises one or more nail polish fluid storage and dispensing capsules such as the capsule 102 optionally locked with one or more detachable locking elements.

As shown at 1402, the process 1200 starts with producing a body portion such as the body portion 104 for one or more capsules 102. The body portion 104 may be produced from one or more materials, for example, a polymer, glass, metal, a ceramic material and/or the like through one or more production methods, for example, molding, 3D printing, CNC machining and/or the like. Optionally, one or more of the material(s) used to produce the body portion 104 is characterized by a low permeability coefficient to prevent one or more components of a nail polish fluid such as the nail polish fluid 150, for example, the solvent and/or the like from diffusing through the body portion 104 and evaporating over time.

As shown at 1404, the process 1200 continues with producing a detachable cover such as the detachable cover 106 for one or more capsules 102. The detachable cover 106 may be produced from one or more materials, for example, a polymer, glass, metal, a ceramic material and/or the like through one or more production methods, for example, molding, 3D printing, CNC machining and/or the like. Optionally, one or more of the material(s) used to produce the detachable cover 106 are characterized by a low permeability coefficient to prevent the nail polish fluid 150 and/or part thereof from diffusing through the detachable cover 106 and evaporating over time.

Optionally, the detachable cover 106 is integrated with a nail polish applying element such as the nail polish applying element 130. A dispensing head such as the dispensing head 134 of the nail polish applying element 130 may be produced using one or more materials, for example, a polymer, metal, hair strands, organic hair and/or the like through one or more production methods, for example, molding, 3D printing, extruding, CNC machining and/or the like. In case the dispensing head 134 comprises a plurality of hair strands such as the dispensing head 134A, the hair strands may fixated to a stem such as the stem 132 of the nail polish applying element 130 by applying one or more methods, for example, pinching, press fit, stapling, welding, soldering, gluing and/or the like. In case the dispensing head 134 comprises one or more other dispensing elements, for example, an elastic tube, a solid pipe, a wiper, a sponge and/or a spray head such as, for example, the dispensing heads 134B, 134C, 134D, 134E and/or 134F, the dispensing element(s) may fixated to the stem 132 by applying one or more methods, for example, pinching, press fit, welding, soldering, gluing and/or the like. Typically, such dispensing elements may be part of the stem 132, the nail polish applying element 130 and/or the integrated detachable cover 106 forming a single piece produced using one or more production methods, for example, molding, 3D printing, CNC machining and/or the like.

Optionally, one or more sealing elements 140 are integrated, applied and/or disposed to the detachable cover 106 and/or to the body portion 104 to seal the opening 114 when the detachable cover 106 is mechanically coupled and/or attached to the body portion 104. The sealing element(s) 140 may be mechanically coupled and/or integrated with the detachable cover 106 and/or the body portion 104. For example, a perimeter sealing element 140 such as, for example, an O-ring, an annular ring and/or the like may be disposed around the perimeter of the bottom face 118 of the detachable cover 106. In another example, the sealing element(s) 140 may be disposed around the stem 132 of the integrated nail polish applying element 130, in particular in proximity to the first end of the stem 132 such that the sealing element(s) 140 are in physical contact with the inner surface of the circumferential walls of the body portion 104 in the area of the opening 114. In another example, a perimeter sealing element 140 such as, for example, an annular ring may be disposed around the perimeter of the upper face 110 of the body portion 104. In another example, a perimeter sealing element 140 such as, for example, an annular ring, a U shaped sealing element and/or the like may be disposed at least partially around an inner circumferential wall of a neck section of the body portion 104 in close proximity to the opening 114. The sealing element(s) 140 may be designed, constructed and/or produced as a separate part(s), for example, the O-ring, the annular ring and/or the like. Optionally, the sealing element(s) 140 may be designed, constructed and/or produced as part of the body portion 104 and/or the nail polish applying element 130, for example, as an over-mold on the stem 132 as a secondary manufacturing step while injecting the stem 132.

As shown at 1406, the nail polish fluid 150 is inserted into the body portion 104.

As shown at 1408, the detachable cover 106 is mechanically coupled to the body portion 104. The detachable cover 106 is mechanically coupled to the body portion 104. The detachable cover 106 may be mechanically coupled to the body portion 104 by applying one or more methods, techniques and/or implementations, for example, press-fit, clamping, clasping, fastening and/or the like. For example, dimensions of the detachable cover 106 may be adapted and/or defined to fit into the body portion with a predefined level of force. Optionally, in case the sealing element(s) 140 are disposed on the detachable cover 106 and/or on the body portion 104, the detachable cover 106 may be adapted to attach to the body portion 104 with a predefined clearance (air gap) where the sealing element(s) 140 are configured to maintain the coupling with the predefined level of force. Moreover, in case the detachable cover 106 is integrated with the nail polish applying element 130, the stem 132 may be configured and/or shaped to fit into an opening such as the opening 114 in an upper face such as the upper face 110 of the body portion 104. Strength of the mechanical coupling between the detachable cover 106 and the body portion 104 may be predefined in terms of detachment force, for example, 1G.

As shown at 1410, which is an optional step, the detachable locking element(s) may be produced. As described herein before, the detachable locking element(s) may apply one or more of a plurality of detachment techniques, methods and/or implementations for detaching the locking element(s) from the capsule(s) 102, for example, removing, moving, breaking, tearing, ripping, rotating, pressing, twisting and/or the like. Exemplary embodiments of the locking element(s) may include, for example, a container such as the container 202 and/or the container 220 having one or more barrier locking elements 212, a wrapping sheet such as the wrapping sheets 222A and/or 222B, a clip such as the clips 232, a magnet such as the magnets 242, a breakable inner lock element such as the such as the breakable inner locking element 252 and/or the like. The locking element(s) may be produced from one or more materials, for example, a polymer, glass, metal, a ceramic material and/or the like through one or more production methods, for example, molding, 3D printing, CNC machining and/or the like.

The dimensions of the locking element(s) may be defined, adapted, configured and/or constructed according to the dimensions of the capsule(s) 102. For example, in case of the container 202, a distance between opposite walls of the container 202 may be set such that when the capsule(s) 102 are inserted in the container 202 in longitudinal positioning, a first wall of the container 202 is in physical contact with a lower face such as the lower face 112 the body portion 104 and a second wall of the container 202 opposite the first wall is in physical contact with a top face such as the top face 120 of the detachable cover 106. In another example, in case of the container 220, a distance between opposite barrier locking elements 212A and 212B may be set according to the distance between external faces of a protrusion such as the protrusion 122 of the detachable cover 106 and a protrusion such as the protrusion 116 of the body portion 104. In another example, the width of the wrapping sheet 222B may be set according to the distance between external faces of the protrusion 122 and the protrusion 116. In another example, a width dimension of the clip(s) 232 may be set according to the distance between external faces of the protrusion 122 and the protrusion 116.

The container 202 and/or the container 220 may include one or more mechanical storage provisions such as the mechanical storage provisions 204 for arranging, guiding and/or securing the capsules 102 in designated locations during and/or after inserting the capsules 102 into the container 202. The container 202 and/or the container 220 may optionally include a cover that when closed may prevent the capsules 102 from moving, falling and/or shifting from their designated locations in the container 202.

As shown at 1412, which is an optional step, the detachable locking elements are applied to the capsule(s) 102. For example, in case the detachable locking element(s) is utilized by the container 202 and/or the container 220, the capsule(s) 102 may be inserted into their designated locations in the container 202 and/or the container 220 respectively to fasten and lock the detachable cover 106 to the body portion 104. In case the container 202 and/or the container 220 include a cover, the cover may be closed after insertion of the capsule(s) 102. In another example, in case the detachable locking element(s) includes the wrapping sheet 222A or 222B, the wrapping sheet 222A or 222B may be disposed over the detachable cover 106 and the body portion, for example, over the protrusion 122 and the protrusion 116 to fasten and lock the detachable cover 106 to the body portion 104. In another example, in case the detachable locking element(s) includes the clip(s) 232 such as, for example, the clip 232A and/or the clip 232B, the clip 232A and/or the clip 232B may be placed, attached, affixed and/or the like to the detachable cover 106 and to the body portion, for example, to the protrusion 122 and to the protrusion 116 to fasten and lock the detachable cover 106 to the body portion 104. In another example, in case the detachable locking element(s) includes the magnets 242, for example, a magnet such as the magnet 242A and a magnet such as the magnet 242B, the magnet 242A and the magnet 242B may be integrated, coupled, placed, attached, affixed and/or the like to the body portion 104 and to the detachable cover 106 respectively. In another example, in case the detachable locking element(s) includes the breakable inner locking element 252, while coupling the detachable cover 106 to the body portion 104 as described in step 1408, the breakable inner locking element 252 may be coupled, placed, attached, affixed and/or the like to lock the detachable cover 106 to the body portion 104.

Optionally, one or more of the capsule 102 is wrapped in a sealed rippable foil sheet, for example, a metal foil, a polymeric foil and/or the like. In such case, the dimensions of one or more of the locking elements, for example, the container 202 and/or the container 220 may be further defined, adapted, configured and/or constructed to set the distance between the opposite walls and/or between the barrier locking elements 212 to allow insertion of the capsule(s) 102 wrapped in the foil sheet. In case of the wrapping sheet 222B and/or the clips 232, the capsule(s) 102 may be wrapped and sealed with the rippable foil sheet after the locking element(s) are applied, for example, after disposing the wrapping sheet 222B and/or after affixing the clip(s) 232.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A capsule integrated with a nail polish applying element for usage by a nail polish application apparatus, said a capsule comprising:
    a body portion defining a reservoir containing a nail polish fluid; and
    a non-screw detachable cover having an integrated nail polish applying element, said non-screw detachable cover comprising at least one mechanical mounting provision encompassing at least partially a circumferential wall of said non-screw detachable cover and shaped for grasping of the non-screw detachable cover by a mounting element of said nail polish application apparatus, said non-screw detachable cover is mechanically coupled to an upper face of said body portion to seal an opening in said upper face.

2. The capsule of claim 1, further comprising said capsule is contained in a rigid container storing at least one said capsule, movement of the non-screw detachable cover with respect to said body portion in a longitudinal axis is limited by a first wall of said container which is in physical contact with an external surface of a bottom of said body portion and a second wall of said container opposite said first wall which is in physical contact with an external surface of a top of said non-screw detachable cover.

3. The capsule of claim 1, wherein said nail polish applying element comprises a stem and a dispensing head, a first end of said stem connects to a bottom face of said non-screw detachable cover and a second end of said stem connects to said dispensing head, wherein said stem protrudes into said body portion when said non-screw detachable cover is attached to said upper face.

4. The capsule of claim 3, further comprising at least one sealing element comprising at least one member of a group consisting of: an axial sealing element, a radial sealing element and a combination thereof, the at least one sealing element is mechanically coupled to at least one of: said upper face, a neck section of said body portion and said stem.

5. The capsule of claim 3, wherein said dispensing head is constructed of at least one member of a group consisting of: a plurality of hair strands, an elastic tube, a solid pipe, a sponge, a wiper, a spray head and a combination of at least two thereof.

6. The capsule of claim 3, further comprising a width of said stem is adapted to at least partially contact at least one inner circumferential wall of a neck section of said body portion to form a resting area for laying down said detachable cover integrated with said nail polish applying element in said body portion.

7. The capsule of claim 1, further comprising said capsule is wrapped in a sealed rippable foil sheet.

8. The capsule of claim 7, wherein said rippable foil sheet is wrapped at least partially around said at least one mechanical mounting provision.

9. The capsule of claim 1, wherein said nail polish fluid is a member selected from a group consisting of: a nail polish fluid, a base coating fluid, a top coating fluid, a drying material, a nail art polish fluid and a medical nail treatment fluid.

10. The capsule of claim 1, wherein said at least one mechanical mounting provision is a member of a group consisting of: a protrusion, a groove and a cavity.

11. The capsule of claim 1, wherein said body portion further comprising at least one mechanical docking provision shaped for locking said body portion in a capsule compartment of said nail polish application apparatus, said at least one mechanical docking provision is a member of a group consisting of: a protrusion, a groove and a cavity.

12. The capsule of claim 1, further comprising said at least one mechanical mounting provision completely encompassing said circumferential wall of said non-screw detachable cover.

13. The capsule of claim 1, further comprising said capsule is contained in a rigid container storing at least one capsule, movement of said non-screw detachable cover with respect to said body portion in a longitudinal axis is limited by at least one barrier locking element of said container which is in physical contact with a top surface of at least one mechanical protrusion disposed on at least part of said circumferential wall of said non-screw detachable cover and a wall of said container opposite said at least one barrier which is in physical contact with an external surface of a bottom side of said body portion.

14. The capsule of claim 1, further comprising said capsule is contained in a rigid container storing at least one capsule, movement of said non-screw detachable cover with respect to said body portion in a longitudinal axis is limited by at least one barrier locking element of said container which is in physical contact with a bottom surface of at least one mechanical protrusion disposed on at least part of said circumferential wall of said body portion and a wall of said container opposite said at least one barrier which is in physical contact with an external surface of a top side of said non-screw detachable cover.

15. The capsule of claim 1, further comprising said capsule is contained in a rigid container storing at least one capsule, movement of said non-screw detachable cover with respect to said body portion in a longitudinal axis is limited by at least one first barrier locking element of said container which is in physical contact with a top surface of at least one mechanical protrusion disposed on at least part of said circumferential wall of said non-screw detachable cover and a at least one second barrier locking element which is in physical contact with a bottom surface of at least one mechanical protrusion disposed on at least part of said circumferential wall of said body portion.

16. A method for manufacturing a capsule integrated with a nail polish applying element for usage by a nail polish application apparatus, comprising:
producing a body portion defining a reservoir adapted to contain nail polish fluid,
producing a non-screw detachable cover having an integrated nail polish applying element and comprising at least one mechanical mounting provision encompassing at least partially a circumferential wall of said non-screw detachable cover and shaped for grasping of said non-screw detachable cover by a mounting element of said nail polish application apparatus, said non-screw detachable cover is mechanically coupled to an upper face of said body portion to seal an opening in said upper face,
inserting said nail polish fluid into said body portion, and
mechanically coupling said non-screw detachable cover to said upper face of said body portion to seal an opening in said upper face.

17. The method of claim 16, further comprising producing at least one sealing element and mechanically coupling said at least one sealing element to at least one of:
said upper face,
a neck section of said body portion, and
a stem of said integrated nail polish applying element connecting a dispensing head of said integrated nail polish applying element to said non-screw detachable cover.

18. The method of claim 17, further comprising inserting said capsule into a container shaped to store at least one capsule in a longitudinal axis positioning and limit a movement of the non-screw detachable cover with respect to the body portion in a longitudinal axis.

19. The method of claim 16, further comprising wrapping said capsule in a sealed rippable foil sheet after mechanically coupling said non-screw detachable cover to said body portion.

* * * * *